US012647955B2

(12) United States Patent
Su et al.

(10) Patent No.: US 12,647,955 B2
(45) Date of Patent: Jun. 2, 2026

(54) SIDELINK COMMUNICATION METHOD, TERMINAL APPARATUS, AND SYSTEM

(71) Applicant: HUAWEI TECHNOLOGIES CO., LTD., Shenzhen (CN)

(72) Inventors: Hongjia Su, Shanghai (CN); Wenting Guo, Shenzhen (CN); Chunxu Jiao, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 18/473,502

(22) Filed: Sep. 25, 2023

(65) Prior Publication Data

US 2024/0015711 A1 Jan. 11, 2024

Related U.S. Application Data

(63) Continuation of application No. PCT/CN2021/083402, filed on Mar. 26, 2021.

(51) Int. Cl.
*H04W 4/00* (2018.01)
*H04L 1/00* (2006.01)
(Continued)

(52) U.S. Cl.
CPC ....... *H04W 72/0446* (2013.01); *H04L 1/0038* (2013.01); *H04W 52/52* (2013.01); *H04W 72/25* (2023.01); *H04W 72/40* (2023.01)

(58) Field of Classification Search
CPC ..... H04W 72/25; H04W 72/40; H04W 52/52; H04W 72/0446
See application file for complete search history.

(56) References Cited

U.S. PATENT DOCUMENTS

| | | | |
|---|---|---|---|
| 11,864,133 B2 * | 1/2024 | Liu | ................... H04W 56/0015 |
| 2018/0103441 A1 * | 4/2018 | Lim | ..................... H04B 7/0452 |

(Continued)

FOREIGN PATENT DOCUMENTS

| | | |
|---|---|---|
| CN | 111148226 A | 5/2020 |
| CN | 111865482 A | 10/2020 |
| WO | 2020033704 A1 | 2/2020 |

OTHER PUBLICATIONS

International Search Report issued in corresponding International Application No. PCT/CN2021/083402, dated Nov. 11, 2021, pp. 1-10.

(Continued)

*Primary Examiner* — Abdelnabi O Musa
(74) *Attorney, Agent, or Firm* — HAUPTMAN HAM, LLP

(57) ABSTRACT

A communication method, a terminal apparatus, and a system. A first terminal apparatus and a second terminal apparatus determine, based on first configuration information, a plurality of candidate resources in a slot, and perform sidelink communication based on the candidate resources. A first symbol in any candidate resource in one slot is used to send first information. In response to a channel access moment of the first terminal apparatus being after a start moment of a first symbol in one candidate resource in a first slot, the first terminal apparatus further sends the first information based on the first symbol in another candidate resource after the channel access moment, without waiting for a next slot after the first slot. In this way, a sidelink communication delay is reduced.

24 Claims, 8 Drawing Sheets

(51) Int. Cl.
| | |
|---|---|
| *H04W 52/52* | (2009.01) |
| *H04W 72/0446* | (2023.01) |
| *H04W 72/25* | (2023.01) |
| *H04W 72/40* | (2023.01) |

(56) References Cited

U.S. PATENT DOCUMENTS

| | | | | |
|---|---|---|---|---|
| 2020/0329469 | A1 | 10/2020 | Su et al. | |
| 2021/0051653 | A1 | 2/2021 | Park et al. | |
| 2021/0219268 | A1* | 7/2021 | Li | H04B 17/318 |
| 2021/0352597 | A1* | 11/2021 | Do | H04W 52/52 |
| 2021/0410112 | A1* | 12/2021 | Qu | H04W 72/0446 |
| 2022/0248450 | A1* | 8/2022 | Kim | H04L 5/0053 |
| 2022/0407652 | A1* | 12/2022 | Lee | H04L 5/0048 |
| 2026/0019210 | A1* | 1/2026 | Lei | H04L 5/0051 |

OTHER PUBLICATIONS

Extended European Search Report issued in corresponding European Application No. 21932287.2, dated Mar. 15, 2024, pp. 1-10.
India Office Action issued in corresponding India Application No. 202347064545, dated Apr. 2, 2025, pp. 1-6.
Nokia, Nokia Shanghai Bell, Discussion of physical layer structure for sidelink, 3GPP TSG RAN WG1 #98 R1-1908282, Prague, CZ, Aug. 26-30, 2019, total 17 pages.
Chinese First Office Action issued in corresponding Chinese Application No. 202180094773.9, dated Mar. 20, 2026, pp. 1-10.

* cited by examiner

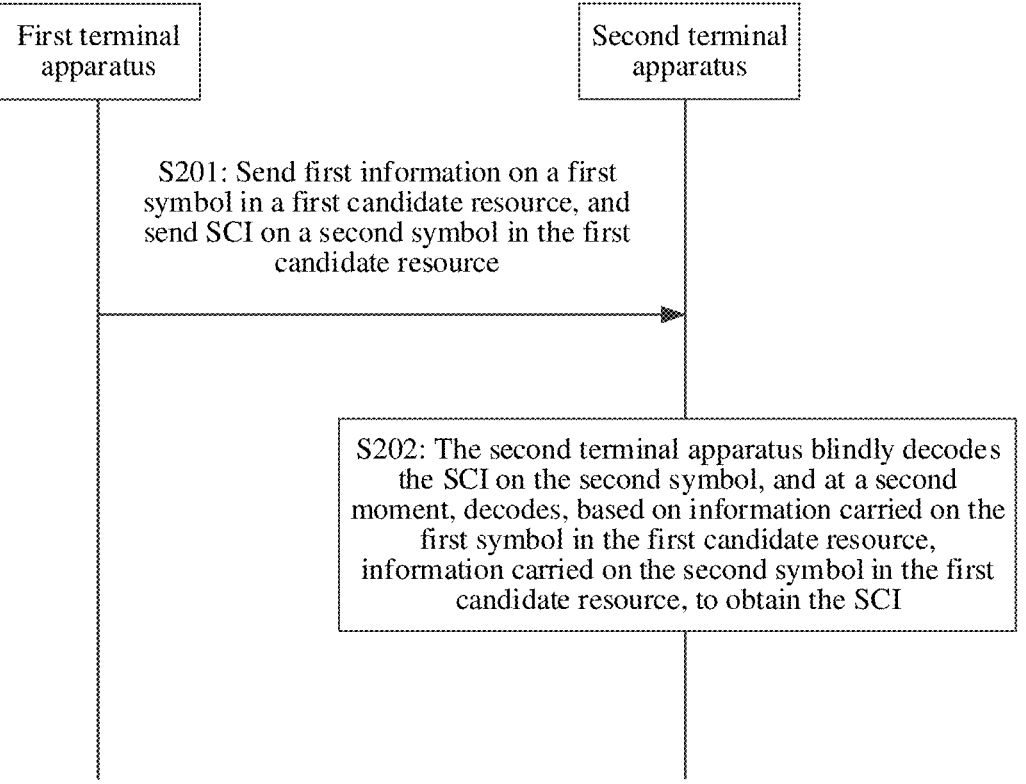

First terminal
apparatus

Second terminal
apparatus

S201: Send first information on a first
symbol in a first candidate resource, and
send SCI on a second symbol in the first
candidate resource S202: The second terminal apparatus blindly decodes
the SCI on the second symbol, and at a second
moment, decodes, based on information carried on the
first symbol in the first candidate resource,
information carried on the second symbol in the first
candidate resource, to obtain the SCI

FIG. 9

SIDELINK COMMUNICATION METHOD, TERMINAL APPARATUS, AND SYSTEM

CROSS-REFERENCE TO RELATED APPLICATIONS

This application is a continuation of International Application No. PCT/CN2021/083402, filed on Mar. 26, 2021, the disclosure of which is hereby incorporated by reference in its entirety.

BACKGROUND

Direct communication between terminal apparatuses is referred to as sidelink communication. In a sidelink communication process, a terminal device serving as a transmitting end sends, to a terminal device serving as a receiving end, at least one of sidelink control information (SCI), sidelink data, feedback information, a reference signal, and the like over a sidelink (SL). The terminal device serving as the receiving end receives and decodes the sidelink data by receiving the SCI. The SCI is carried on a physical sidelink control channel (PSCCH), and the sidelink data is carried on a physical sidelink shared channel (PSSCH). The receiving end decodes, only after correctly decoding the SCI carried on the PSCCH, the sidelink data carried on the PSSCH.

In addition, because the sidelink communication is usually a distributed system, the terminal apparatus needs to perform automatic gain control (AGC) processing, to enable a terminal apparatus serving as a receiving end to adjust strength of a received signal to strength used for accurate decoding. According to an AGC mechanism, a terminal apparatus serving as a transmitting end is used to send AGC information on a start symbol in a slot, for example, the $1^{st}$ symbol used for sidelink communication in the slot, and the terminal apparatus serving as the receiving end correctly receives the SCI only by performing AGC based on the AGC information, and receive the sidelink data based on the SCI.

In conclusion, a location of the AGC information in one slot is fixedly a start symbol used for sidelink communication. Therefore, in response to the terminal apparatus accessing a channel after the start symbol used for sidelink communication in the slot, the terminal apparatus only waits for a next slot to perform sidelink communication, resulting in an increase in a sidelink communication delay.

SUMMARY

Embodiments described herein provide a communication method, a terminal apparatus, and a system, to reduce a sidelink communication delay.

According to a first aspect, at least one embodiment provides a communication method. The method is performed by a first terminal apparatus and/or a second terminal apparatus. The first terminal apparatus and/or the second terminal apparatus is a terminal or a component in the terminal, for example, a processor, a chip, or a chip system. The first terminal apparatus and the second terminal apparatus support sidelink communication.

According to the method, the first terminal apparatus and/or the second terminal apparatus obtains first configuration information, and determine, based on the first configuration information, at least two consecutive candidate resources in a first slot. The candidate resource includes a plurality of consecutive symbols, and the plurality of symbols include at least one first symbol and at least one second symbol. The first symbol is used to transmit first information, the second symbol is used to transmit sidelink control information, and the first symbol precedes the second symbol.

According to the method shown in the first aspect, the first terminal apparatus and/or the second terminal apparatus determines the candidate resources based on the first configuration information, and perform sidelink communication based on the candidate resources. The first symbol in any candidate resource is used to send the first information. Therefore, even in response to a channel access moment of the first terminal apparatus being after a start moment of the first symbol in one candidate resource in the first slot, the first terminal apparatus further sends the first information based on the first symbol in another candidate resource after the channel access moment, without waiting for a next slot after the first slot. In this way, a sidelink communication delay is reduced.

In a possible design, the first configuration information includes information about a quantity of consecutive second symbols in the candidate resource.

In a possible design, the first terminal apparatus further sends the first information on the first symbol in a first candidate resource, and send the sidelink control information on the second symbol in the first candidate resource, where the first candidate resource is the $1^{st}$ candidate resource in the candidate resources after a first moment, the first moment is the channel access moment of the first terminal apparatus, and the first moment is in the first slot.

In a possible design, in response to the first moment being before a start moment of the first candidate resource, the first terminal apparatus further sends the second information between the first moment and the start moment of the first candidate resource. According to this design, a channel that has been accessed by the first terminal apparatus is prevented from being occupied by another terminal apparatus, and a transmission delay is further reduced.

In a possible design, the second information includes replication information of the first information, replication information of the sidelink control information, an extended cyclic prefix of the first information, or an extended cyclic prefix of the sidelink control information.

In a possible design, the first terminal apparatus further sends third information on a first resource, where the first resource includes the first symbol and/or the second symbol after the first candidate resource, and the third information is carried on a sidelink data channel.

In a possible design, the second terminal apparatus blindly decodes the sidelink control information on the second symbol.

In a possible design, after a second moment, the second terminal apparatus stops blindly decoding the sidelink control information on the candidate resources in the first slot, to reduce processing overheads. The second moment is a moment at which the second terminal apparatus obtains the sidelink control information carried on the second symbol in the first candidate resource, where the first candidate resource is one of the candidate resources.

In a possible design, the second terminal apparatus performs automatic gain control adjustment based on information carried on the first symbol in an $i^{th}$ candidate resource in the candidate resources before the second moment, where $i=1, 2, \ldots, n$, n is a quantity of candidate resources that are in the first slot and that are before the second moment, the second moment is the moment at which the second terminal apparatus obtains the sidelink control information carried on the second symbol in the first candidate resource, and the first candidate resource is one of the candidate resources.

The second terminal apparatus further decodes, based on a result of the automatic gain control adjustment, information carried on the second symbol in the $i^{th}$ candidate resource.

In a possible design, the second terminal apparatus further stores at least one piece of fourth information, where the fourth information is information carried on the first symbol and the second symbol in a $j^{th}$ candidate resource in the candidate resources before the second moment, to improve transmission reliability, where j=2, 3, . . . , n, n is the quantity of candidate resources that are in the first slot and that are before the second moment, the second moment is the moment at which the second terminal apparatus obtains the sidelink control information carried on the second symbol in the first candidate resource, and the first candidate resource is one of the candidate resources.

In a possible design, the second communication apparatus further decodes, based on the sidelink control information, the fourth information after the first candidate resource and information after a last piece of fourth information.

According to a second aspect, at least one embodiment provides a communication method. The method is performed by a network device or a component in the network device, such as a processor, a chip, or a chip system. Optionally, the network device supports configuring a communication resource for sidelink communication. An example in which the method is performed by the network device is used below for description.

According to the method, the network device determines first configuration information, where the first configuration information indicates at least two candidate resources in a first slot, the candidate resource includes a plurality of consecutive symbols, the plurality of symbols include at least one first symbol and at least one second symbol, the first symbol is used to transmit first information, the second symbol is used to transmit sidelink control information, and the first symbol precedes the second symbol. The network device is further configured to send the first configuration information.

In a possible design, the first configuration information includes information about a quantity of consecutive second symbols in the candidate resource.

According to a third aspect, at least one embodiment provides a communication method. The method is performed by a first terminal apparatus. For the first communication apparatus, refer to descriptions in the first aspect.

According to the method, the first terminal apparatus sends first information on a first symbol in a first candidate resource, and send sidelink control information on a second symbol in the first candidate resource, where the first candidate resource is the $1^{st}$ candidate resource in candidate resources after a first moment, the first moment is a channel access moment of the first terminal apparatus, and the first moment is in a first slot.

In a possible design, in response to the first moment being before a start moment of the first candidate resource, the first terminal apparatus further sends second information between the first moment and the start moment of the first candidate resource. According to this design, a channel that has been accessed by the first terminal apparatus is prevented from being occupied by another terminal apparatus, and a transmission delay is further reduced.

In a possible design, the second information includes replication information of the first information, replication information of the sidelink control information, an extended cyclic prefix of the first information, or an extended cyclic prefix of the sidelink control information.

In a possible design, the first terminal apparatus further sends third information on a first resource, where the first resource includes the first symbol and/or the second symbol after the first candidate resource, and the third information is carried on a sidelink data channel.

For the candidate resources, the first symbol, and/or the second symbol in the third aspect, refer to descriptions in the first aspect.

According to a fourth aspect, at least one embodiment provides a communication method. The method is performed by a second terminal apparatus. For the second communication apparatus, refer to descriptions in the first aspect.

According to the method, the second terminal apparatus blindly decodes sidelink control information on a second symbol.

In a possible design, after a second moment, the second terminal apparatus stops blindly decoding sidelink control information on candidate resources in a first slot. The second moment is a moment at which the second terminal apparatus obtains sidelink control information carried on the second symbol in a first candidate resource, where the first candidate resource is one of the candidate resources.

In a possible design, the second terminal apparatus performs automatic gain control adjustment based on information carried on a first symbol in an $i^{th}$ candidate resource in the candidate resources before the second moment, where i=1, 2, . . . , n, n is a quantity of candidate resources that are in the first slot and that are before the second moment, the second moment is the moment at which the second terminal apparatus obtains the sidelink control information carried on the second symbol in the first candidate resource, and the first candidate resource is one of the candidate resources. The second terminal apparatus further decodes, based on a result of the automatic gain control adjustment, information carried on the second symbol in the $i^{th}$ candidate resource.

In a possible design, the second terminal apparatus further stores at least one piece of fourth information, where the fourth information is information carried on the first symbol and the second symbol in a $j^{th}$ candidate resource in the candidate resources before the second moment, where j=2, 3, . . . , n, n is the quantity of candidate resources that are in the first slot and that are before the second moment, the second moment is the moment at which the second terminal apparatus obtains the sidelink control information carried on the second symbol in the first candidate resource, and the first candidate resource is one of the candidate resources.

In a possible design, the second communication apparatus further decodes, based on the sidelink control information, the fourth information after the first candidate resource and information after a last piece of fourth information.

For the candidate resources, the first symbol, and/or the second symbol in the fourth aspect, refer to descriptions in the first aspect.

According to a fifth aspect, at least one embodiment provides a communication apparatus. The communication apparatus implements the method implemented by the first communication apparatus and/or the second communication apparatus in the first aspect or any possible design of the first aspect. The apparatus includes a corresponding module, unit, or component configured to perform the foregoing method. The module included in the apparatus is implemented in a software and/or hardware manner. The apparatus is, for example, a first communication apparatus and/or a second communication apparatus, or a component, a baseband chip, a chip system, or a processor that supports the first communication apparatus and/or the second communication apparatus in implementing the foregoing method.

For example, the communication apparatus includes modular components such as a transceiver module or a communication module, and a processing module or a processing unit. These modules performs corresponding functions of the first communication apparatus and/or the second communication apparatus in the first aspect or any possible design of the first aspect. In response to the communication apparatus being the first communication apparatus and/or the second communication apparatus, the transceiver module is a transmitter or a receiver, or a transceiver obtained by integrating the transmitter and the receiver. The transceiver module is a sending module or a receiving module, or obtained by integrating the sending module and the receiving module. The transceiver module includes a communication interface, an antenna, a radio frequency circuit, and/or the like. The processing module is a processor, for example, a baseband chip. In response to the communication apparatus being a component having a function of the first communication apparatus and/or the second communication apparatus, the transceiver module is a radio frequency module or the communication interface, and the processing module is the processor. In response to the communication apparatus being the chip system, the transceiver module is an input/output interface of the chip system, and the processing module is a processor of the chip system, for example, a central processing unit (CPU).

Optionally, in response to the communication apparatus being implemented by using a software module, the communication apparatus includes the transceiver module and/or the processing module. In response to the communication apparatus being implemented by using a hardware component, the communication apparatus includes the transceiver and/or the processor.

The transceiver module or the transceiver is configured to perform a receiving action and/or a sending action performed by the first communication apparatus and/or the second communication apparatus in the first aspect or any possible design of the first aspect. The processing module or the processor is configured to perform an action other than receiving and sending performed by the first communication apparatus and/or the second communication apparatus in the first aspect or any possible design of the first aspect.

In response to the communication apparatus including the transceiver module and the processing module, the transceiver module is configured to obtain first configuration information, and the processing module is configured to determine, based on the first configuration information, at least two consecutive candidate resources in a first slot.

In a possible design, the transceiver module is further configured to send first information on a first symbol in a first candidate resource, and send sidelink control information on a second symbol in the first candidate resource. For the first information and the sidelink control information, refer to descriptions in the first aspect.

In a possible design, in response to a first moment being before a start moment of the first candidate resource, the transceiver module is further configured to send second information between the first moment and the start moment of the first candidate resource. For the first candidate resource, the first moment, and the second information, refer to descriptions in the first aspect.

In a possible design, the transceiver module is further configured to send third information on a first resource. For the first resource and the third information, refer to descriptions in the first aspect.

In a possible design, the transceiver module is configured to blindly decode the sidelink control information on the second symbol.

In a possible design, after a second moment, the transceiver module stops blindly decoding the sidelink control information on the candidate resources in the first slot. For the second moment, refer to descriptions in the first aspect.

In a possible design, the transceiver module is further configured to perform automatic gain control adjustment based on information carried on the first symbol in an $i^{th}$ candidate resource in candidate resources before the second moment, and decode, based on a result of the automatic gain control adjustment, information carried on the second symbol in the $i^{th}$ candidate resource. For i, refer to descriptions in the first aspect.

In a possible design, the processing module is configured to store at least one piece of fourth information. For the fourth information, refer to descriptions in the first aspect.

In a possible design, the transceiver module is further configured to decode, based on the sidelink control information, the fourth information after the first candidate resource and information after a last piece of fourth information.

According to a sixth aspect, at least one embodiment provides a communication apparatus. The communication apparatus implements the method implemented by the network device in the second aspect or any possible design of the second aspect. The apparatus includes a corresponding module, unit, or component configured to perform the foregoing method. The module included in the apparatus is implemented in a software and/or hardware manner. The apparatus is, for example, a network device, or a component, a baseband chip, a chip system, or a processor that supports the network device in implementing the foregoing method.

For example, the communication apparatus includes modular components such as a transceiver module or a communication module, and a processing module or a processing unit. These modules performs corresponding functions of the network device in the second aspect or any possible design of the second aspect. In response to the communication apparatus being the network device, the transceiver module is a transmitter or a receiver, or a transceiver obtained by integrating the transmitter and the receiver. The transceiver module is a sending module or a receiving module, or obtained by integrating the sending module and the receiving module. The transceiver module includes a communication interface, an antenna, a radio frequency circuit, and/or the like. The processing module is a processor, for example, a baseband chip. In response to the communication apparatus being a component having a function of the network device, the transceiver module is a radio frequency module or the communication interface, and the processing module is the processor. In response to the communication apparatus being the chip system, the transceiver module is an input/output interface of the chip system, and the processing module is a processor of the chip system, for example, a central processing unit.

Optionally, in response to the communication apparatus being implemented by using a software module, the communication apparatus includes the transceiver module and/or the processing module. In response to the communication apparatus being implemented by using a hardware component, the communication apparatus includes the transceiver and/or the processor.

The transceiver module or the transceiver is configured to perform a receiving action and/or a sending action performed by the network device in the second aspect or any possible design of the second aspect. The processing module or the processor is configured to perform an action other than receiving and sending performed by the network device in the second aspect or any possible design of the second aspect.

In response to the communication apparatus including the transceiver module and the processing module, the processing module is configured to determine first configuration information, and the sending module is configured to send the first configuration information. For the first configuration information, refer to descriptions in the first aspect.

According to a seventh aspect, at least one embodiment provides a communication apparatus. The communication apparatus implements the method implemented by the first communication apparatus in the third aspect or any possible design of the third aspect. The apparatus includes a corresponding module, unit, or component configured to perform the foregoing method. The module included in the apparatus is implemented in a software and/or hardware manner. The apparatus is, for example, a first communication apparatus, or a component, a baseband chip, a chip system, or a processor that supports the first communication apparatus in implementing the foregoing method.

For example, the communication apparatus includes modular components such as a transceiver module or a communication module, and a processing module or a processing unit. These modules performs corresponding functions of the first communication apparatus in the third aspect or any possible design of the third aspect. In response to the communication apparatus being the first communication apparatus, the transceiver module is a transmitter or a receiver, or a transceiver obtained by integrating the transmitter and the receiver. The transceiver module is a sending module or a receiving module, or obtained by integrating the sending module and the receiving module. The transceiver module includes a communication interface, an antenna, a radio frequency circuit, and/or the like. The processing module is a processor, for example, a baseband chip. In response to the communication apparatus being a component having a function of the first communication apparatus, the transceiver module is a radio frequency module or the communication interface, and the processing module is the processor. In response to the communication apparatus being the chip system, the transceiver module is an input/output interface of the chip system, and the processing module is a processor of the chip system, for example, a central processing unit.

Optionally, in response to the communication apparatus being implemented by using a software module, the communication apparatus includes the transceiver module and/or the processing module. In response to the communication apparatus being implemented by using a hardware component, the communication apparatus includes the transceiver and/or the processor.

The transceiver module or the transceiver is configured to perform a receiving action and/or a sending action performed by the first communication apparatus in the third aspect or any possible design of the third aspect. The processing module or the processor is configured to perform an action other than receiving and sending performed by the first communication apparatus in the third aspect or any possible design of the third aspect.

In response to the communication apparatus including the transceiver module and the processing module, the transceiver module is configured to send first information on a first symbol in a first candidate resource, and send sidelink control information on a second symbol in the first candidate resource. For the first information and the sidelink control information, refer to descriptions in the first aspect.

In a possible design, in response to a first moment being before a start moment of the first candidate resource, the transceiver module is further configured to send second information between the first moment and the start moment of the first candidate resource. For the first candidate resource, the first moment, and the second information, refer to descriptions in the first aspect.

In a possible design, the transceiver module is further configured to send third information on a first resource. For the first resource and the third information, refer to descriptions in the first aspect.

According to an eighth aspect, at least one embodiment provides a communication apparatus. The communication apparatus implements the method implemented by the second communication apparatus in the fourth aspect or any possible design of the fourth aspect. The apparatus includes a corresponding module, unit, or component configured to perform the foregoing method. The module included in the apparatus is implemented in a software and/or hardware manner. The apparatus is, for example, a second communication apparatus, or a component, a baseband chip, a chip system, or a processor that supports the second communication apparatus in implementing the foregoing method.

For example, the communication apparatus includes modular components such as a transceiver module or a communication module, and a processing module or a processing unit. These modules performs corresponding functions of the second communication apparatus in the fourth aspect or any possible design of the fourth aspect. In response to the communication apparatus being the second communication apparatus, the transceiver module is a transmitter or a receiver, or a transceiver obtained by integrating the transmitter and the receiver. The transceiver module is a sending module or a receiving module, or obtained by integrating the sending module and the receiving module. The transceiver module includes a communication interface, an antenna, a radio frequency circuit, and/or the like. The processing module is a processor, for example, a baseband chip. In response to the communication apparatus being a component having a function of the second communication apparatus, the transceiver module is a radio frequency module or the communication interface, and the processing module is the processor. In response to the communication apparatus being the chip system, the transceiver module is an input/output interface of the chip system, and the processing module is a processor of the chip system, for example, a central processing unit.

Optionally, in response to the communication apparatus being implemented by using a software module, the communication apparatus includes the transceiver module and/or the processing module. In response to the communication apparatus being implemented by using a hardware component, the communication apparatus includes the transceiver and/or the processor.

The transceiver module or the transceiver is configured to perform a receiving action and/or a sending action performed by the second communication apparatus in the fourth aspect or any possible design of the fourth aspect. The processing module or the processor is configured to perform an action other than receiving and sending performed by the second communication apparatus in the fourth aspect or any possible design of the fourth aspect.

In response to the communication apparatus including the transceiver module and the processing module, the transceiver module is configured to blindly decode sidelink control information on a second symbol.

In a possible design, after a second moment, the transceiver module stops blindly decoding the sidelink control information on the candidate resources in the first slot. For the second moment, refer to descriptions in the first aspect.

In a possible design, the transceiver module is further configured to perform automatic gain control adjustment based on information carried on a first symbol in an i$^{th}$ candidate resource in candidate resources before the second moment, and decode, based on a result of the automatic gain control adjustment, information carried on the second symbol in the i$^{th}$ candidate resource. For i, refer to descriptions in the first aspect.

In a possible design, the processing module is configured to store at least one piece of fourth information. For the fourth information, refer to descriptions in the first aspect.

In a possible design, the transceiver module is further configured to decode, based on the sidelink control information, the fourth information after a first candidate resource and information after a last piece of fourth information.

According to a ninth aspect, a communication system is provided. The communication system includes the communication apparatuses shown in the fifth aspect to the sixth aspect, to be specific, includes the first communication apparatus and/or the second communication apparatus configured to perform the method shown in the first aspect, and includes the network device configured to perform the method shown in the second aspect. Alternatively, the communication system includes the communication apparatuses shown in the seventh aspect to the eighth aspect, to be specific, includes the first communication apparatus configured to perform the method shown in the third aspect, and includes the second communication apparatus configured to perform the method shown in the fourth aspect.

According to a tenth aspect, a computer-readable storage medium is provided. The computer-readable storage medium is configured to store computer instructions. In response to the computer instructions running on a computer, the computer is enabled to perform the method shown in the first aspect to the fourth aspect or any possible implementation of the first aspect to the fourth aspect.

According to an eleventh aspect, a computer program product including instructions is provided. The computer program product is configured to store computer instructions. In response to the computer instructions running on a computer, the computer is enabled to perform the method shown in the first aspect to the fourth aspect or any possible implementation of the first aspect to the fourth aspect.

According to a twelfth aspect, a circuit is provided. The circuit is coupled to a memory, and the circuit is configured to perform the method shown in the first aspect to the fourth aspect or any possible implementation of the first aspect to the fourth aspect. The circuit includes a chip and/or a chip circuit.

For beneficial effects of the second aspect to the twelfth aspect and any possible design, refer to the beneficial effects of the first aspect and the possible designs of the first aspect.

BRIEF DESCRIPTION OF DRAWINGS

FIG. 9 is a schematic flowchart of another method according to at least one embodiment;

DESCRIPTION OF EMBODIMENTS

Figures 1, 2:
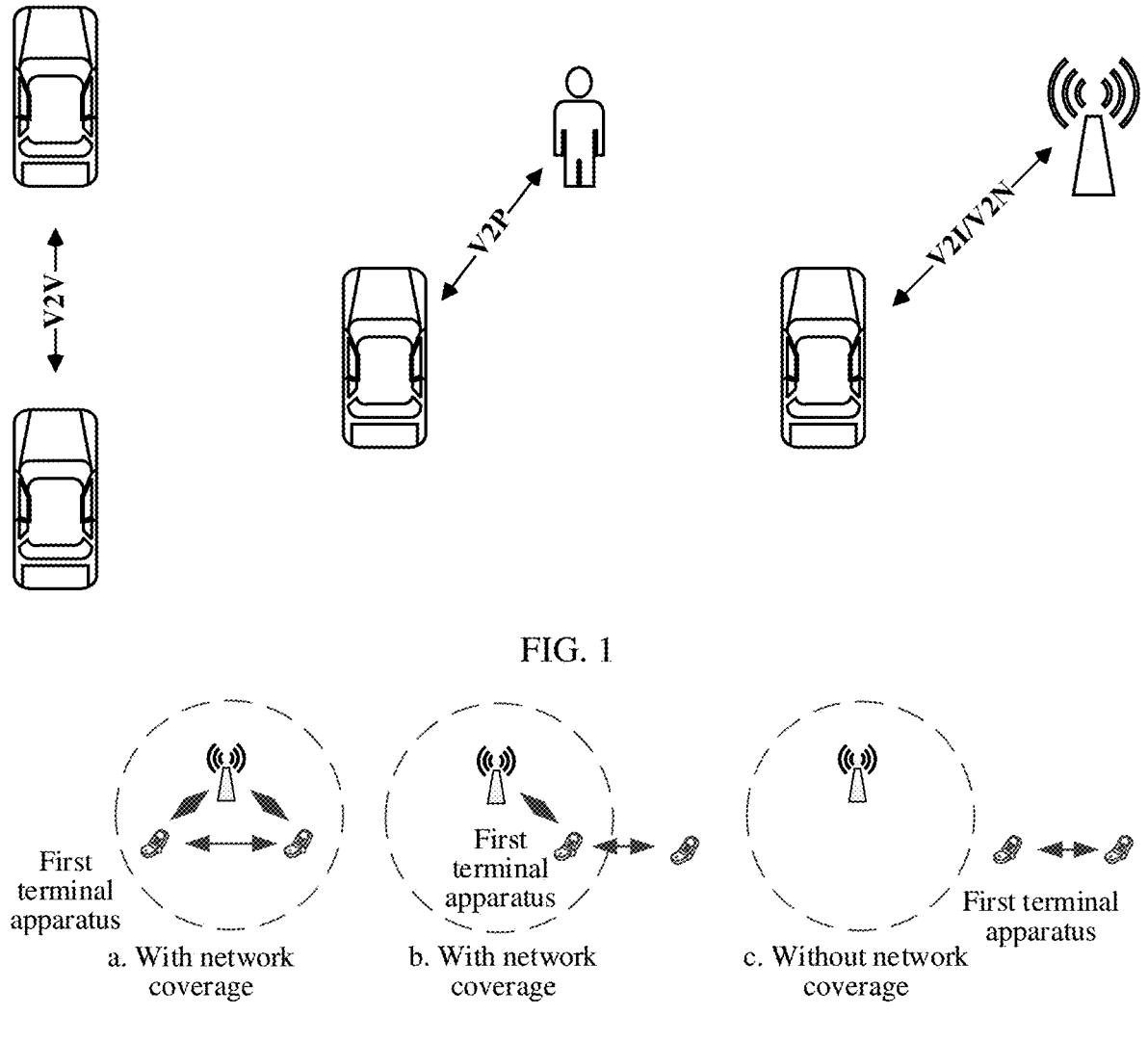
FIG. 1 is an example diagram of a sidelink communication scenario according to at least one embodiment.
FIG. 2 is a schematic diagram of network coverage of sidelink communication according to at least one embodiment.

To make the objectives, technical solutions, and advantages of embodiments described herein clearer, the following further describes embodiments in detail with reference to the accompanying drawings.

The following describes some terms in embodiments described herein, to facilitate understanding of a person skilled in the art.

(1) A terminal apparatus is, for example, a terminal device, or a module configured to implement a function of the terminal device, for example, a chip system, where the chip system is disposed in the terminal device. The terminal device includes a device that provides data connectivity for a user. For example, the terminal device includes a handheld device having a wireless connection function, or a processing device connected to a wireless modem. The terminal device communicates with a core network through a radio access network (RAN), exchange data with the RAN, or exchange voice and data with the core network. The terminal device includes a user equipment (UE), a wireless terminal device, a mobile terminal device, a device-to-device (D2D) communication terminal device, a vehicle-to-everything (V2X) communication terminal device, a machine-to-machine/machine type communication (M2M/MTC) terminal device, an internet of things (IoT) terminal device, or the like. Most typically, the terminal apparatus is a carrier such as a vehicle, a ship, or aircraft, a terminal-type roadside unit, or a communication module or chip disposed in the vehicle or the roadside unit.

In at least one embodiment, communication between terminal devices through a direct communication (PC5) interface is supported, that is, transmission between the terminal devices through a sidelink is supported.

As an example instead of a limitation, in at least one embodiment, the terminal device is alternatively a wearable device. The wearable device is also referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that implements all or some of functions without depending on smartphones, for example, smart watches or smart glasses, and include devices that are dedicated to only one type of application function and need to collaboratively work with other devices such as smartphones, for example, various smart bands, smart helmets, or smart jewelry for monitoring physical signs.

In response to the various terminal devices described above being located in a vehicle (for example, placed in the vehicle or installed in the vehicle), the terminal devices is all considered as in-vehicle terminal devices. For example, the in-vehicle terminal devices are also referred to as on-board units (OBU).

In at least one embodiment, the terminal device further includes a relay. Alternatively, all devices that perform data communication with a base station is considered as terminal devices.

Optionally, a road side unit (RSU) is further considered as a terminal apparatus.

The following describes a communication method provided in at least one embodiment by using the terminal apparatus as an example. For example, in sidelink communication, a party that sends sidelink data is referred to as a terminal apparatus serving as a transmitting end, and a party configured to receive the sidelink data is referred to as a terminal apparatus serving as a receiving end. For ease of description, the terminal apparatus serving as the transmitting end is subsequently referred to as a first terminal apparatus, and terminal apparatus serving as the receiving end is referred to as a second terminal apparatus.

(2) A network device includes, for example, an access network (AN) device such as a base station, and is a device that communicates with a terminal apparatus over an air interface through one or more cells in an access network. Alternatively, for example, a network device in a V2X technology is a road side unit (RSU). The RSU is a fixed infrastructure entity that supports a V2X application, and exchanges a message with another entity that supports the V2X application. The network device includes an evolved universal terrestrial radio access network NodeB (eNB) or a next generation NodeB (gNB) in a fifth generation mobile communication technology (5G) NR system, or includes a central unit (CU) and a distributed unit (DU) in a cloud access network (Cloud RAN) system. This is not limited in at least one embodiment.

Because embodiments described herein mainly relate to an access network device, the network device described below is an access network device unless otherwise specified. In the following, the network device and/or the access network device is represented by a base station.

In at least one embodiment, an apparatus configured to implement a function of the network device is a network device, or is an apparatus, for example, a chip system, that can support the network device in implementing the function. The apparatus is installed in the network device. In the technical solutions provided in at least one embodiment, the technical solutions provided in at least one embodiment are described by using an example in which the apparatus configured to implement the function of the network device is the network device.

(3) Sidelink communication refers to communication between terminal apparatuses through a sidelink in at least one embodiment.

The following describes the sidelink communication by using V2X communication as an example.

The V2X communication is intended for high-speed devices represented by vehicles, and is a basic technology and key technology used in future scenarios that have a very high communication latency specification. Application fields of the V2X communication include smart cars, autonomous driving, and intelligent transportation systems. As shown in FIG. 1, relatively typical V2X communication scenarios include vehicle to vehicle (V2V) communication, vehicle to pedestrian (V2P) communication, vehicle to infrastructure (V2I) communication, or vehicle to network (V2N) communication. For the V2V communication, the first terminal apparatus and/or the second terminal apparatus is a vehicle, an in-vehicle terminal apparatus located in the vehicle, or the like. For the V2P communication, one of the first terminal apparatus and the second terminal apparatus is a vehicle, an in-vehicle terminal apparatus located in the vehicle, or the like, and the other is a terminal apparatus carried by a pedestrian, such as a mobile terminal or a wearable device. For the V2P communication, one of the first terminal apparatus and the second terminal apparatus is a vehicle, an in-vehicle terminal apparatus located in the vehicle, or the like, and the other is an infrastructure such as an RSU. For the V2N communication, one of the first terminal apparatus and the second terminal apparatus is a vehicle, an in-vehicle terminal apparatus located in the vehicle, or the like, and the other is a base station.

Based on the V2X communication, the first terminal apparatus sends status information such as a location or a speed of the first terminal apparatus, driving intention information such as turning, paralleling, or reversing, or information triggered by a periodic or aperiodic event as sidelink data to a surrounding terminal apparatus. Similarly, the first terminal apparatus also receives sidelink data from another surrounding terminal apparatus. In addition, the first terminal apparatus further forwards the sidelink data of another terminal apparatus received by the first terminal apparatus. For example, the sidelink data and/or sidelink feedback information are/is carried on a PSSCH. The sidelink feedback information includes hybrid automatic repeat request (HARQ) feedback information, for example, an acknowledgment (ACK) or a negative acknowledgment (NACK), and further includes channel state indication (CSI) feedback information.

The V2X communication supports a communication scenario with network coverage and a communication scenario without network coverage. In a scenario of first terminal apparatuses with network coverage denoted by numbers a and b in FIG. 2, a network device scheduling mode is used as a resource allocation manner in response to the first terminal apparatus performs sending through the V2X communication. For example, a resource that is used by the terminal apparatus to perform sidelink communication and that is scheduled and sent by a network device is referred to as a licensed resource or a licensed frequency band. In a scenario of a first terminal apparatus without network coverage denoted by a number c in FIG. 2, or in a case in which the first terminal apparatus with network coverage does not use the network device scheduling mode, the first terminal apparatus selects a resource, to be specific, select a resource used for sidelink communication from a resource pool. The resource is referred to as an unlicensed resource or an unlicensed frequency band. The resource in at least one embodiment is a time-frequency resource.

In network coverage, the terminal apparatus obtains SL resource pool configuration information and/or SL bandwidth part (BWP) configuration information by receiving a system information block (SIB) of a network device, cell-specific radio resource control (RRC) signaling, or user-specific RRC signaling of the terminal apparatus. The terminal apparatus alternatively uses preconfigured SL resource pool configuration information or SL BWP configuration information, for example, in response to there being no network coverage. The SL resource pool configuration information includes resource pool resource information, and the resource pool resource information indicates an SL resource pool. A resource pool is a set of time-frequency resources, and is used for sidelink communication between UEs. The resource pool includes a code domain resource. Resources in the resource pool include a resource that is sent and received by the terminal apparatus and that is of at least one of the following physical channels: a PSCCH, a PSSCH, a PSDCH, a PSFCH, and a PSBCH. A service type carried on the PSSCH includes a unicast, multicast, and/or broadcast communication type. In time domain, the SL resource pool includes one or more time units, and the time unit is one or more symbols, one or more slots, one or more mini-slots, one or more subframes, one or more frames, or the like. The one or more time units is consecutive or discrete in time. Time domain units in a resource pool are logically consecutive.

Figure 3:
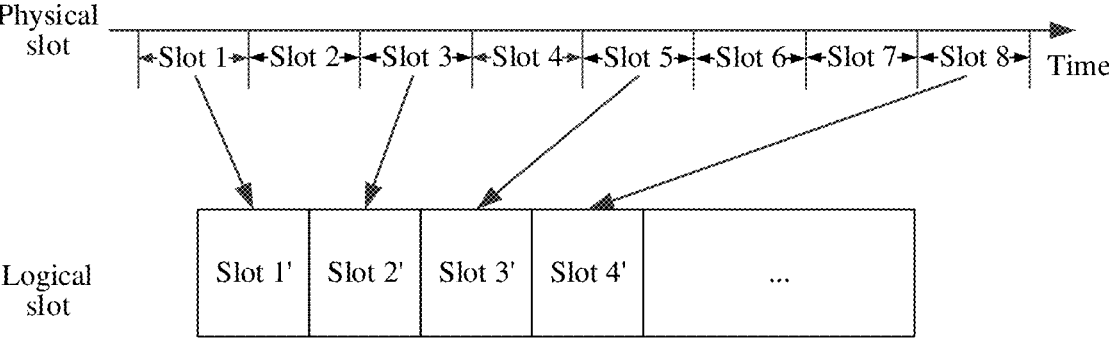
FIG. 3 is a schematic diagram of comparison between a physical slot and a logical slot according to at least one embodiment.

As shown in FIG. 3, a slot 1 to a slot 8 are consecutive slots in time, and such slots are referred to as physical slots. The physical slots, namely, the slot 1, a slot 3, a slot 5, and the slot 8, are configured as slots that belong to a resource pool. Because slots included in a resource pool is nonconsecutive in time, from the perspective of the resource pool, the slot 1, the slot 3, the slot 5, and the slot 8 in the physical slots correspond to a slot 1', a slot 2', a slot 3', and a slot 4' in the resource pool. Consecutive slots (namely, the slot 1', the slot 2', the slot 3', and the slot 4') included in the resource pool are logically consecutive slots in the resource pool. Such slots that are logically consecutive but are not necessarily consecutive in time are referred to as logical slots. In frequency domain, the SL resource pool includes one or more frequency domain units. The frequency domain unit is one or more resource elements (Res), one or more resource blocks (RBs), or one or more sub channels. A size of a sub channel indicates a quantity of one or more continuous or interlaced RBs included in the sub channel in frequency domain, and the quantity is an integer such as 10, 12, 15, 20, 25, or 50. The interlaced RBs are one manner of discrete RBs. For example, in response to a plurality of RBs included in a sub channel being interlaced, any two adjacent RBs included in the sub channel are separated by at least one RB that does not belong to the sub channel.

The SL resource pool configuration information further includes PSCCH configuration information, and the PSCCH configuration information includes a quantity of symbols occupied by a PSCCH in a slot and a quantity of RBs occupied by a PSCCH in a sub channel. The SL BWP configuration information includes SL resource pool information for configuring a quantity of resource pools included in a BWP. The SL BWP configuration information includes SL bandwidth information indicating a size of a bandwidth for performing SL communication, for example, indicating that an SL bandwidth is 20 megahertz (MHz).

The SL BWP configuration information further includes SL symbol information indicating a location of a start SL symbol in a slot and a quantity of occupied consecutive SL symbols. The SL BWP configuration information further includes subcarrier spacing information and cyclic prefix information of an SL for indicating a subcarrier spacing and a cyclic prefix that are used for SL communication. The cyclic prefix indicates an extended cyclic prefix or a normal cyclic prefix. In a possible configuration, the SL BWP configuration information further includes the SL resource pool configuration information. In at least one embodiment, unless a meaning of the time unit is specially specified, a slot is used for description, but a time unit is not limited to only the slot. Unless a meaning of the time domain unit or the frequency domain unit is specially specified, a sub channel is used for description, but a frequency domain unit is not limited to only the sub channel.

In the unlicensed frequency band, a terminal apparatus serving as a transmitting end accesses a signal in a contention-based mode, for example, in a channel access mode defined by the European Telecommunications Standards Institute (ETSI). The contention-based access mode mainly includes a load based equipment (LBE) mode and a frame based equipment (FBE) mode.

For access in the unlicensed frequency band, the terminal apparatus needs to perform listen before talk (LBT) on both LBE and FBE. For example, energy-based detection is used for the access in the unlicensed frequency band. A detection threshold (energy detection threshold) needs to be set for the energy-based detection. In response to channel energy detected by the terminal apparatus exceeding the detection threshold, a channel is determined to be busy, and access to the channel is not allowed. In response to the detected channel energy being less than the detection threshold, in response to this situation lasting for more than a period of time, for example, 34 microseconds (p), backoff is allowed to be started. A size of a backoff window relates to a service priority, and a higher priority indicates a smaller backoff window. The terminal apparatus randomly selects a backoff value K from the backoff window to perform backoff. In response to the detected energy being less than the detection threshold for every 9 μs, the value of K decreases by 1, and the channel is not allowed to be accessed for communication until the backoff value K decreases to 0. A moment at which the backoff value K decreases to 0 is a moment at which the terminal apparatus accesses the channel. In a process in which the backoff value K decreases to 0, in response to the energy detected by the terminal apparatus being higher than the detection threshold, the channel is busy, and the backoff is stopped. In response to the detected energy being less than the detection threshold for 34 μs again, the backoff is resumed. In other words, the backoff is resumed based on the backoff value in response to the backoff being stopped last time.

In at least one embodiment, a sidelink communication resource (or referred to as a resource for short) is a time-frequency resource in a resource pool for sidelink communication, and the terminal apparatus serving as the transmitting end sends sidelink information on the resource. One resource carries one or more of a PSCCH, a PSSCH, a physical sidelink feedback channel (PSFCH), and a reference signal such as a demodulation reference signal (DMRS). A time domain scheduling unit of a sidelink resource is one slot, or is one mini-slot, and a frequency domain scheduling unit is a sub channel, or is one or more continuous or interlaced RBs.

Figure 4:
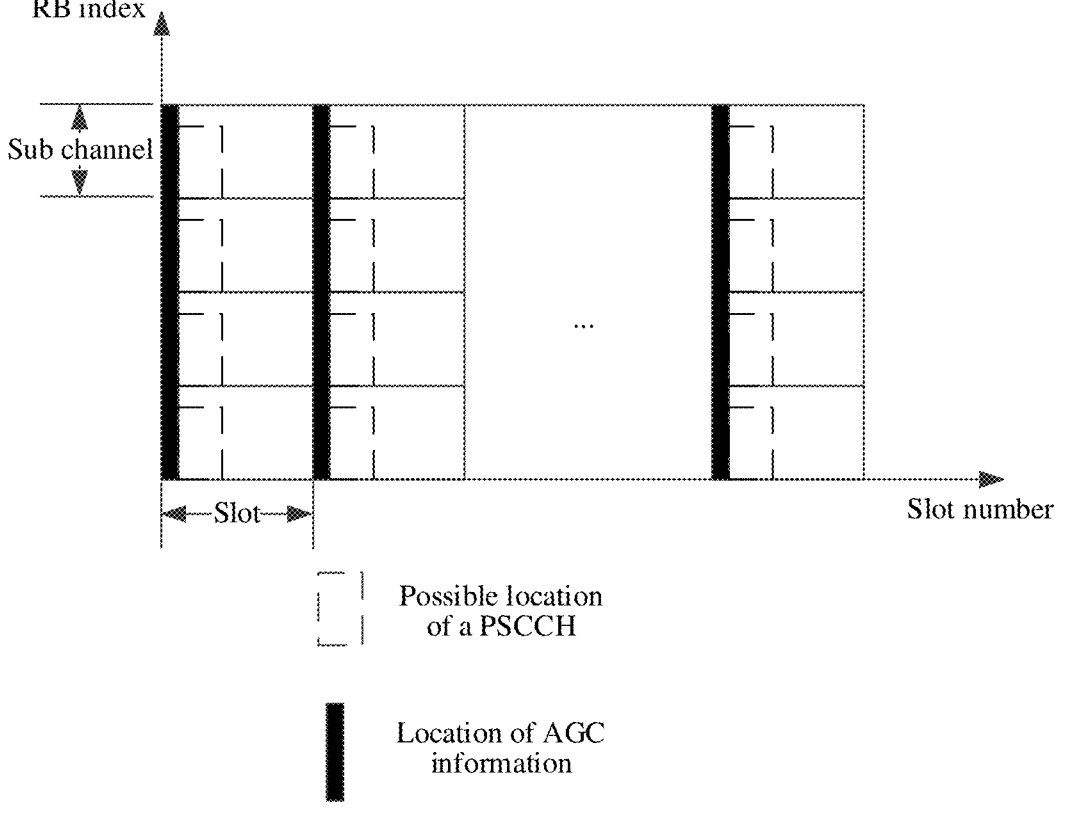
FIG. 4 is a schematic diagram of an AGC location according to at least one embodiment.

As shown in FIG. 4, a PSCCH exists in each sub channel in each slot. To be specific, a time domain start location of a PSCCH is a start moment of a second symbol used for sidelink communication in each slot. In at least one embodiment, the symbol is an orthogonal frequency division multiplexing (OFDM) symbol. A quantity of consecutive symbols occupied by the PSCCH is determined by resource pool configuration information, for example, is one, two, three, or another quantity that does not exceed 14. A frequency domain start location of the PSCCH is a physical resource block (PRB) with a smallest index in each sub channel. A quantity of RBs occupied by the PSCCH is determined by the SL resource pool configuration information, for example, is a quantity of RBs whose size does not exceed a size of the sub channel.

In addition, in NR sidelink communication, in different slots, both a first terminal apparatus and a second terminal apparatus that communicate over an SL is different. Therefore, for a second terminal apparatus, first terminal apparatuses from which the second terminal apparatus receives SL communication in different slots is different. In other words, first terminal apparatuses from which the second terminal apparatus receives SL communication in different slots is located in different geographical locations, and therefore a near-far effect exists. As a result, received signal strength of the second terminal apparatus in different slots changes in a relatively wide dynamic range and is unpredictable. In response to received signal strength of the sidelink not being within an appropriate strength range of the second terminal apparatus, the second terminal apparatus is unable to accurately decode sidelink information. The sidelink information includes at least one type of information such as sidelink discovery information, sidelink control information, sidelink data information, sidelink feedback information, sidelink synchronization information, or sidelink pilot information.

To control the received signal strength of the second terminal apparatus within a proper range, AGC, which is also referred to as AGC adjustment, is introduced in sidelink communication. To be specific, the second terminal apparatus adjusts the received signal strength in a receiving link to a specific expected power suitable for optimal performance through analog or digital gains, to meet a signal-to-noise ratio (SNR) used for correct decoding. Specifically, in response to the received signal strength being low, an AGC algorithm increases a receiving gain stage of the second terminal apparatus, so that an SNR of a received signal reaches an acceptable range. In response to the received signal strength being high, the AGC algorithm attenuates the receiving gain stage, to avoid SNR deterioration caused by signal clipping and non-linear degradation.

In a sidelink communication system, for example, in a 5G NR standard R16 architecture, the first terminal apparatus replicates all information on the second symbol used for sidelink communication in a slot to the $1^{st}$ symbol used for sidelink communication in the slot. For ease of description, the information replicated onto the $1^{st}$ symbol is referred to as AGC information. To reduce overheads caused by performing AGC in a slot, transmit power of the first terminal apparatus on symbols in the slot is the same, and the second terminal apparatus needs to perform AGC only once on the $1^{st}$ symbol used for sidelink communication in the slot, to ensure that an AGC result is consistent in the entire slot. In other words, based on the AGC result, is ensured that received signal strength is within an acceptable range in the slot. Specifically, the second terminal apparatus performs AGC based on the AGC information in the $1^{st}$ symbol used for sidelink communication, and obtains an AGC result. Then, the second terminal apparatus decodes, based on the AGC result, sidelink information received by remaining symbols used for sidelink communication in the slot. The remaining symbols used for sidelink communication in the slot include the second symbol used for sidelink communication, a last symbol used for sidelink communication, and a symbol located between the second symbol and the last symbol. The sidelink information includes SCI and sidelink data. Therefore, receiving and adjusting the AGC information are used for correctly receiving the SCI and the sidelink data. In at least one embodiment, the SCI represents control information used to schedule the sidelink data. The control information used to schedule the sidelink data alternatively has another name. This is not limited in at least one embodiment.

In response to the AGC information being carried only on the $1^{st}$ symbol used for sidelink communication in a slot, and the first terminal apparatus needs to perform LBT to access a channel for communication (for example, access a channel of an unlicensed spectrum), in the slot, the first terminal apparatus sends the AGC information on the $1^{st}$ symbol only in response to the first terminal apparatus completing the LBT at a start moment of the $1^{st}$ symbol in the slot to access the channel, so that a second terminal performs AGC adjustment in the slot, and further receives sidelink information sent by a first terminal. Therefore, in response to the first terminal apparatus not being able to transmit the AGC information on the Pt symbol used for sidelink communication in the slot, the second terminal cannot perform the AGC adjustment on the $1^{st}$ symbol used for sidelink communication, and cannot correctly receive, in the slot, the sidelink information sent by the first terminal. The first terminal only waits to send the AGC information on the $1^{st}$ symbol in a next slot, and therefore, a sidelink communication delay is increased.

At least one embodiment provides a communication method, to reduce a sidelink communication delay. The communication method is performed by a first terminal apparatus and/or a second terminal apparatus. The first terminal apparatus is configured to send data to the second terminal apparatus over a sidelink.

Figure 5:
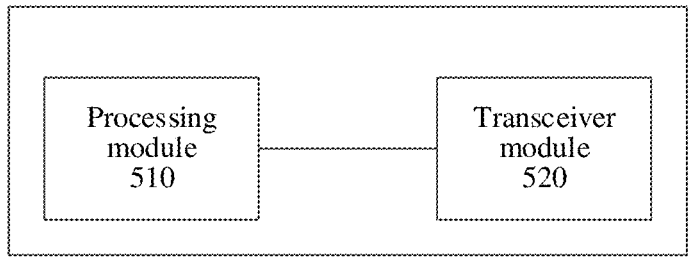
FIG. 5 is a schematic diagram of a communication apparatus according to at least one embodiment.
Figure 6:
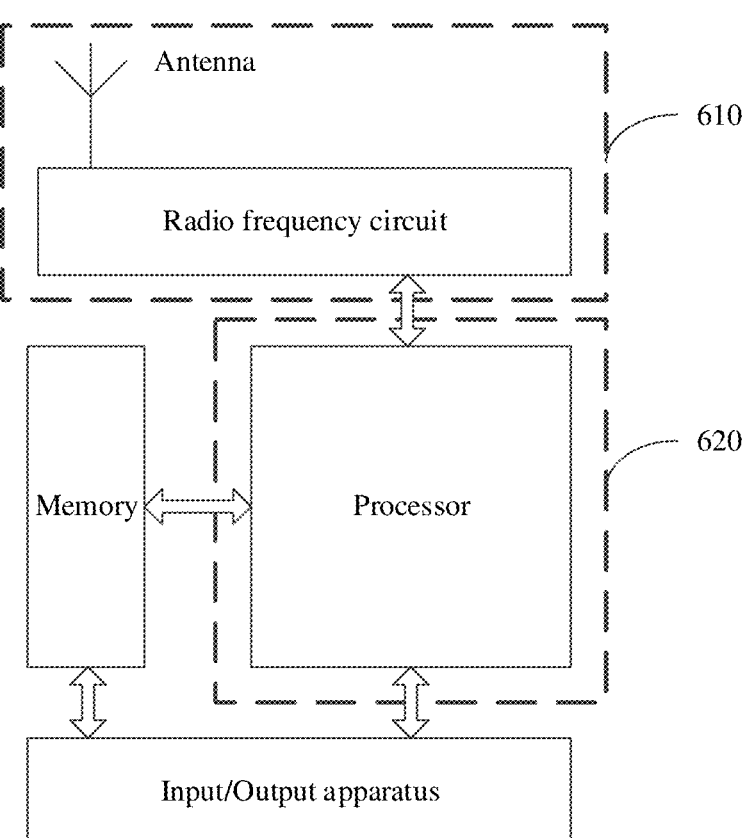
FIG. 6 is a schematic diagram of another communication apparatus according to at least one embodiment.

The following describes, with reference to FIG. 5 and FIG. 6, a possible structure of the first terminal apparatus and/or the second terminal apparatus provided. In at least one embodiment.

For example, FIG. 5 shows a schematic diagram of a possible structure of the first terminal apparatus and/or the second terminal apparatus. The structure includes a processing module 510 and a transceiver module 520. For example, the structure shown in FIG. 5 is a terminal device, or is a chip used in the terminal device, or another combined device, member, or component having a function of the terminal device shown in at least one embodiment. In response to the structure being the terminal device, the transceiver module 520 is a transceiver, and the transceiver includes an antenna, a radio frequency circuit, and the like; and the processing module 510 is a processor, for example, a baseband processor, and the baseband processor includes one or more central processing units (CPUs). In response to the structure being the component having the function of the terminal device shown in at least one embodiment, the transceiver module 520 is a radio frequency unit, and the processing module 510 is a processor, for example, a baseband processor. In response to the structure being a chip system, the transceiver module 520 is an input/output interface of a chip, for example, a baseband chip, and the processing module 510 is a processor of the chip system, and includes one or more central processing units. In at least one embodiment, the processing module 510 is implemented by a processor or a processor-related circuit component, and the transceiver module 520 is implemented by a transceiver or a transceiver-related circuit component.

For example, the processing module 510 is configured to perform all operations, except sending and receiving operations, performed by the first terminal apparatus and/or the second terminal apparatus in at least one embodiment, for example, a processing operation, and/or configured to support another process of the technology described in this specification, for example, generate a message, information, and/or signaling sent by the transceiver module 520, and process a message, information, and/or signaling received by the transceiver module 520. The transceiver module 520 is configured to perform all the receiving and sending operations performed by the first terminal apparatus and/or the second terminal apparatus in at least one embodiment, and/or configured to support another process of the technology described in embodiments herein, for example, data sending and/or receiving.

In addition, the transceiver module 520 is a functional module. The functional module completes both a sending operation and a receiving operation. For example, the transceiver module 520 is configured to perform all sending operations and receiving operations performed by a relay node and/or a remote node. For example, in response to performing the sending operation, the transceiver module 520 is considered as a sending module, and in response to performing the receiving operation, the transceiver module 520 is considered as a receiving module. Alternatively, the transceiver module 520 is two functional modules. The transceiver module 520 is considered as a general name of the two functional modules. The two functional modules are respectively a sending module and a receiving module. The sending module is configured to complete a sending operation. For example, the sending module is configured to perform all the sending operations performed by the first terminal apparatus and/or the second terminal apparatus. The receiving module is configured to complete a receiving operation, and the receiving module is configured to perform all the receiving operations performed by the first terminal apparatus and/or the second terminal apparatus.

FIG. 6 is a schematic diagram of a structure of another terminal apparatus, configured to perform the actions performed by the first terminal apparatus and/or the second terminal apparatus. In at least one embodiment. For ease of understanding and illustration, as shown in FIG. 6, the terminal apparatus includes a processor, a memory, a radio frequency circuit, an antenna, and/or an input/output apparatus. The processor is mainly configured to: process a communication protocol and communication data, control the terminal apparatus, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. Some types of terminal apparatuses have no input/output apparatus.

In response to sending data, after performing baseband processing on to-be-sent data, the processor outputs a baseband signal to the radio frequency circuit; and the radio frequency circuit performs radio frequency processing on the baseband signal and then sends the radio frequency signal to outside in a form of an electromagnetic wave through the antenna. In response to data being sent to the terminal apparatus, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. In an actual terminal device product, there is one or more processors and one or more memories. The memory is also referred to as a storage medium, a storage device, or the like. The memory is disposed independent of the processor, or is integrated with the processor. This is not limited. In at least one embodiment.

In at least one embodiment, the antenna and the radio frequency circuit that have receiving and sending functions is considered as a transceiver unit of the terminal apparatus. The transceiver unit is a functional unit, and the functional unit implements a sending function and a receiving function. Alternatively, the transceiver unit includes two functional units: a receiving unit that implements a receiving function and a sending unit that implements a sending function. A processor having a processing function is considered as a processing unit of the terminal apparatus. As shown in FIG. 6, the terminal apparatus includes a transceiver unit 610 and a processing unit 620. The transceiver unit is also referred to as a transceiver, a transceiver machine, a transceiver apparatus, or the like. The processing unit is also referred to as a processor, a processing board, a processing module, a processing apparatus, or the like. Optionally, a component that is in the transceiver unit 610 and that is configured to implement a receiving function is considered as a receiving unit, and a component that is in the transceiver unit 610 and that is configured to implement a sending function is considered as a sending unit. That is, the transceiver unit 610 includes the receiving unit and the sending unit. The transceiver unit sometimes is also referred to as a transceiver machine, a transceiver, a transceiver circuit, or the like. The receiving unit sometimes is also referred to as a receiver machine, a receiver, a receive circuit, or the like. The sending unit sometimes is also referred to as a transmitter machine, a transmitter, a transmit circuit, or the like.

The transceiver unit 610 corresponds to the transceiver module 520, or the transceiver module 520 is implemented by the transceiver unit 610. The transceiver unit 610 is configured to perform the sending operation and the receiving operation of the first terminal apparatus and/or the second terminal apparatus in embodiments shown in at least one embodiment, and/or configured to support another process of the technology described herein. The processing unit 620 corresponds to the processing module 510, or the processing module 510 is implemented by the processing unit 620. The processing unit 620 is configured to perform an operation other than the receiving and sending operations of the first terminal apparatus and/or the second terminal apparatus in embodiments shown in at least one embodiment, for example, configured to perform all operations, except receiving and sending, performed by the first terminal apparatus and/or the second terminal apparatus in embodiments shown herein, and/or configured to support another process of the technology described in at least one embodiment.

In addition, the structure shown in FIG. 5 and/or FIG. 6 is further used to implement a network device or a component of the network device. The network device is, for example, a base station, a CU, or a DU. For example, the processing module 510 shown in FIG. 5 and/or the processing unit 620 shown in FIG. 6 is configured to implement processing steps performed by the base station and/or operations other than receiving and sending performed by the base station in the communication method provided in at least one embodiment. The transceiver module 520 shown in FIG. 5 and/or the transceiver unit 610 shown in FIG. 6 is configured to implement a receiving operation and/or a sending operation performed by the base station in the communication method provided in at least one embodiment. In response to the structure shown in FIG. 6 being used to implement the network device, the structure does not include the input/output apparatus. For ease of description in embodiments herein, the network device or the component of the network device is referred to as a third communication apparatus.

The following describes the communication method provided in at least one embodiment with reference to the accompanying drawings.

According to the method, the first terminal apparatus and/or the second terminal apparatus obtains first configuration information. The first configuration information is used by the first terminal apparatus and/or the second terminal apparatus to determine at least two candidate locations of AGC information and at least two candidate locations of a PSCCH in a slot. Therefore, even in response to a moment at which the first terminal apparatus accesses a channel is after a candidate location of AGC information in a slot, the first terminal apparatus still sends the AGC information in the slot based on a candidate location of the AGC information after the channel access moment, without waiting for a next slot, so that a sidelink communication delay is reduced.

In response to the first terminal apparatus and/or the second terminal apparatus being implemented by the structure shown in FIG. 5 and/or FIG. 6, receiving and sending actions performed by the first terminal apparatus and/or the second terminal apparatus in the communication method provided in at least one embodiment is performed by the transceiver module 520 shown in FIG. 5 and/or the transceiver unit 610 shown in FIG. 6. A processing action and another action except the receiving and sending actions performed by the first terminal apparatus and/or the second terminal apparatus in the communication method provided in at least one embodiment is performed by the processing module 510 shown in FIG. 5 and/or the processing unit 620 shown in FIG. 6. In response to the network device or the component in the network device being implemented by the structure shown in FIG. 5 and/or FIG. 6, receiving and sending actions performed by the network device in the communication method provided in at least one embodiment is performed by the transceiver module 520 shown in FIG. 5 and/or the transceiver unit 610 shown in FIG. 6. A processing action and another action except the receiving and sending actions performed by the network device in the communication method provided in at least one embodiment is performed by the processing module 510 shown in FIG. 5 and/or the processing unit 620 shown in FIG. 6.

Figure 7:
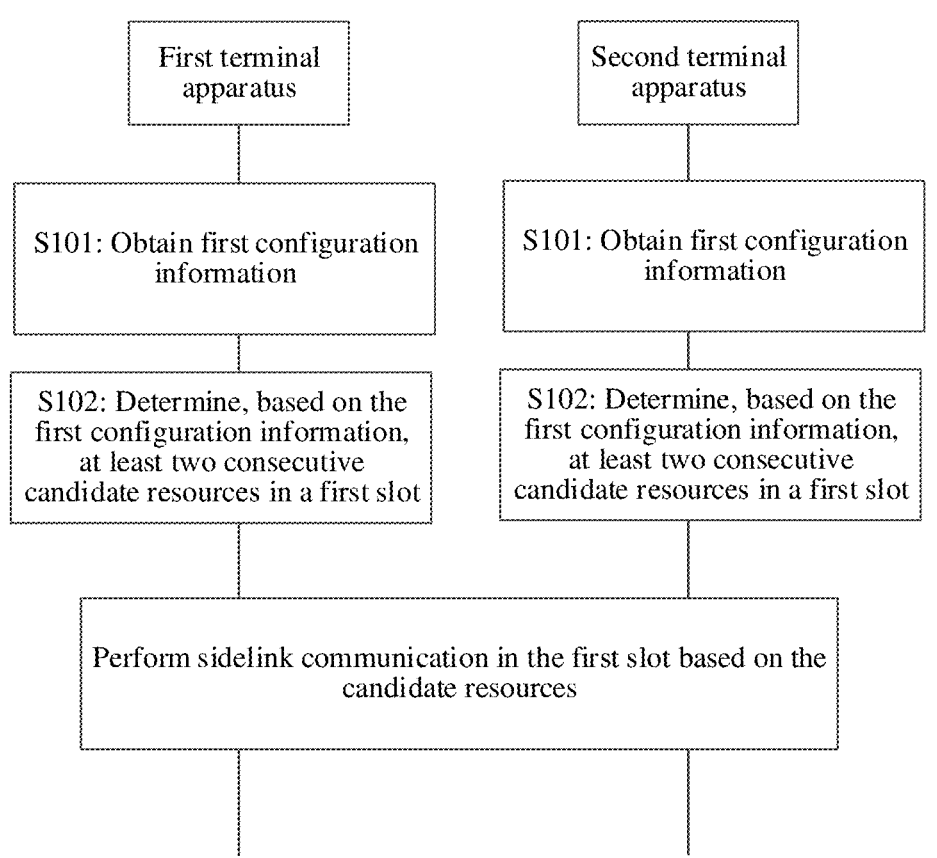
FIG. 7 is a schematic flowchart of a method according to at least one embodiment.

As shown in FIG. 7, a communication method provided in at least one embodiment includes the following steps.

S101: A first terminal apparatus and/or a second terminal apparatus separately obtain/obtains first configuration information.

At least one embodiment includes obtaining in a receiving manner, and further includes obtaining in a manner of reading from a memory. A time sequence in which the first terminal apparatus and the second terminal apparatus separately obtain the first configuration information is not specifically limited in embodiments described herein, provided that the first terminal apparatus and the second terminal apparatus separately obtain the first configuration information before performing sidelink communication.

The first terminal apparatus and/or the second terminal apparatus receives the first configuration information from a network device. The network device sends the first configuration information by using a system information block (SIB), cell-specific radio resource control (RRC) signaling, or user-specific RRC signaling.

Optionally, the second terminal apparatus alternatively obtains the first configuration information from the first terminal apparatus, where the first terminal apparatus configures or indicates the obtained first configuration information for or to the second terminal apparatus by using at least one bearer manner such as PC5 interface RRC signaling, an SL media access control control element (MAC CE), and SCI.

Optionally, the first terminal apparatus alternatively obtains the first configuration information from the second terminal apparatus, where the second terminal apparatus configures or indicates the obtained first configuration information for or to the first terminal apparatus by using at least one bearer manner such as PC5 interface RRC signaling, an SL MAC CE, and SCI.

Optionally, the first configuration information includes SL BWP configuration information and/or SL resource pool configuration information.

Optionally, in S101, the first terminal apparatus and/or the second terminal apparatus receives the first configuration information from a same network device or different network devices.

The obtaining in S101 includes receiving and reading. The reading is, for example, obtaining from a local storage. For example, the first configuration information is stored in the first terminal apparatus and/or the second terminal apparatus. In S101, the first terminal apparatus and/or the second terminal apparatus read/reads the local storage to obtain the first configuration information. Optionally, the first configuration information is preconfigured in the first terminal apparatus and/or the second terminal apparatus.

S102: The first terminal apparatus and/or the second terminal apparatus determine, based on the first configuration information, at least two consecutive candidate resources in a first slot. For the two consecutive candidate resources, a number of the last symbol of a former candidate resource and a number of the $1^{st}$ symbol of a latter candidate resource are consecutive in time domain.

The first slot includes a symbol used for sidelink communication and/or a gap symbol. The symbol used for sidelink communication is a symbol that is used to transmit sidelink information in the first slot. The gap symbol is used by a terminal device to process transmit/receive conversion and/or consider a transmission delay, and is not used to send sidelink information. In a slot, locations of and a quantity of symbols used for sidelink communication is indicated by the first configuration, indicated by a terminal user, or determined through preconfiguration.

The candidate resource includes a plurality of consecutive symbols used for sidelink communication in the first slot. The plurality of symbols include at least one first symbol and at least one second symbol. The first symbol is used to transmit first information, in other words, the first symbol is a candidate resource of the first information. The second symbol is used to transmit SCI, in other words, the second symbol is a candidate resource of the SCI, or the second symbol is occupied by a PSCCH. A quantity of second symbols included in the candidate resource is a quantity of consecutive symbols occupied by the PSCCH. Alternatively, in one of a plurality of candidate resources, the first symbol is used to transmit the first information, and the second symbol is used to transmit the SCI. The first symbol is located before the second symbol, in other words, all first symbols in the candidate resource are located before the first second symbol in the candidate resource.

Optionally, the first information is AGC information, that is, information used by the second terminal apparatus to perform AGC. The first information is replication information of the SCI or replication information of a subset of the SCI. The SCI refers to SCI carried on the second symbol. The replication information of the subset of the SCI refers to partial information replicated from the SCI. In response to a quantity of symbols occupied by a PSCCH carrying the SCI being greater than one, only SCI on some symbols is replicated as the first information. For example, in response to the PSCCH carrying the SCI occupying two symbols, the replication information of the subset of the SCI is information about the $1^{st}$ symbol on the PSCCH carrying the SCI. The first information alternatively is replication information of information on any symbol in the first slot. The first information is alternatively a sequence used for AGC adjustment.

For example, the first configuration information indicates a start location of the symbol used for sidelink communication in the first slot, and $$I_{symb\_start}^{SL}$$

represents an index of the $1^{st}$ symbol used for sidelink communication in the first slot. The first configuration information further indicates a quantity of symbols used for sidelink communication in the first slot, which is represented by $$N_{symb\_length}^{SL}.$$

The first configuration information further indicates the quantity of consecutive symbols occupied by the PSCCH in the first slot. The quantity is the quantity of second symbols in the candidate resource, and is represented by $$N_{symb}^{PSCCH}.$$

The first configuration information further indicates a minimum quantity of symbols used for sidelink communication in a slot, which is represented by $$N_{min\_symb\_length}^{SL}.$$

In other words, a quantity of symbols that are used for sidelink communication and that are included in a slot is not less than $$N_{min\_symb\_length}^{SL}.$$

In addition, $$N_{min\_symb\_length}^{SL}$$

alternatively is a value determined by the first terminal apparatus and/or the second terminal apparatus, a value preconfigured in the first terminal apparatus and/or the second terminal apparatus, or a value predefined in a standard, for example, $$N_{min\_symb\_length}^{SL} = 7$$

is predefined.

Optionally, a value of the index $$I_{symb\_start}^{SL}$$

of the symbol used for sidelink communication in the first slot is one of values in a set $\{0, 1, 2, \ldots, l-1\}$, where $$l = 14 - N_{min\_symb\_length}^{SL}.$$

A value of a minimum quantity $$N_{min\_symb\_length}^{SL}$$

of symbols used for sidelink communication in a slot is one of values in a set $\{1, 2, 3, \ldots, 14\}$. In response to a quantity of symbols in a slot being 14, a value of $$N_{symb\_length}^{SL}$$

of symbols used for sidelink communication is one of values in a set $$\{N_{min\_symb\_length}^{SL}, N_{min\_symb\_length}^{SL} + 1, \ldots, 14\}.$$

In at least one embodiment, for ease of description, unless otherwise specified, an example in which the index $$I_{symb\_start}^{SL} = 0$$

of the symbol used for sidelink communication at the start location in the first slot, the minimum quantity $$N_{min\_symb\_length}^{SL} = 7$$

of symbols used for sidelink communication in a slot, and the quantity $$N_{symb\_length}^{SL} = 14$$

of symbols used for sidelink communication is used for description. However, embodiments described herein are not limited to this example.

Optionally, the first configuration information further includes $$N_{CandidateResource}^{PSCCH},$$

representing a quantity of candidate resources in the first slot. Alternatively, $$N_{candidateResource}^{PSCCH}$$

is a value determined by the first terminal apparatus and/or the second terminal apparatus, a value preconfigured in the first terminal apparatus and/or the second terminal apparatus, or a value predefined in a standard.

The quantity $$N_{CandidateResource}^{PSCCH}$$

of candidate resources in the first slot satisfies:

$$N_{CandidateResource}^{PSCCH} = \left\lfloor \frac{N_{symb\_length}^{SL}}{N_{symb}^{PSCCH} + 1} \right\rfloor.$$

Alternatively, the quantity $$N_{CandidateResource}^{PSCCH}$$

of candidate resources in the first slot is indicated by the first configuration information, and a value of $$N_{CandidateResource}^{PSCCH}$$

is one of values in a set $$\left\{ 1, 2, 3, \ldots, \left\lfloor \frac{N_{symb\_length}^{SL}}{N_{symb}^{PSCCH} + 1} \right\rfloor \right\};$$

or the quantity $$N_{CandidateResource}^{PSCCH}$$

of candidate resources in the first slot is the value predefined in the standard, for example, the value is 2 or 3.

Optionally, in response to a minimum quantity k of symbols used for transmitting the AGC information, the PSCCH, and the PSSCH in a slot is considered, and that the last symbol in the slot is a gap symbol is considered, that is, SL information is not sent on the symbol, the quantity of candidate resources in the first slot satisfies:

$$N_{candidateResource}^{PSCCH} = \left\lfloor \frac{N_{symb\_length}^{SL} - \left(k - N_{symb}^{PSCCH} - 1\right) - 1}{N_{symb}^{PSCCH} + 1} \right\rfloor.$$

Alternatively, a maximum value of $$N_{candidateResource}^{PSCCH}$$

does not exceed $$\left\lfloor \frac{N_{symb\_length}^{SL} - \left(k - N_{symb}^{PSCCH} - 1\right) - 1}{N_{symb}^{PSCCH} + 1} \right\rfloor,$$

and the first configuration information indicates a value of $$N_{candidateResource}^{PSCCH}.$$

Herein, k represents the minimum quantity of symbols used for transmitting the AGC information, the PSCCH, and the PSSCH in a slot, and refers to the minimum quantity of symbols that is used to transmit the AGC information, the PSCCH, and the PSSCH in the slot, where the symbols that is used to transmit the AGC information, the PSCCH, and the PSSCH do not include a gap symbol. k is a value configured by the network device, a value determined by the first terminal apparatus and/or the second terminal apparatus, a value preconfigured in the first terminal apparatus and/or the second terminal apparatus, or a value predefined in a standard, for example, k=6.

Figure 8:
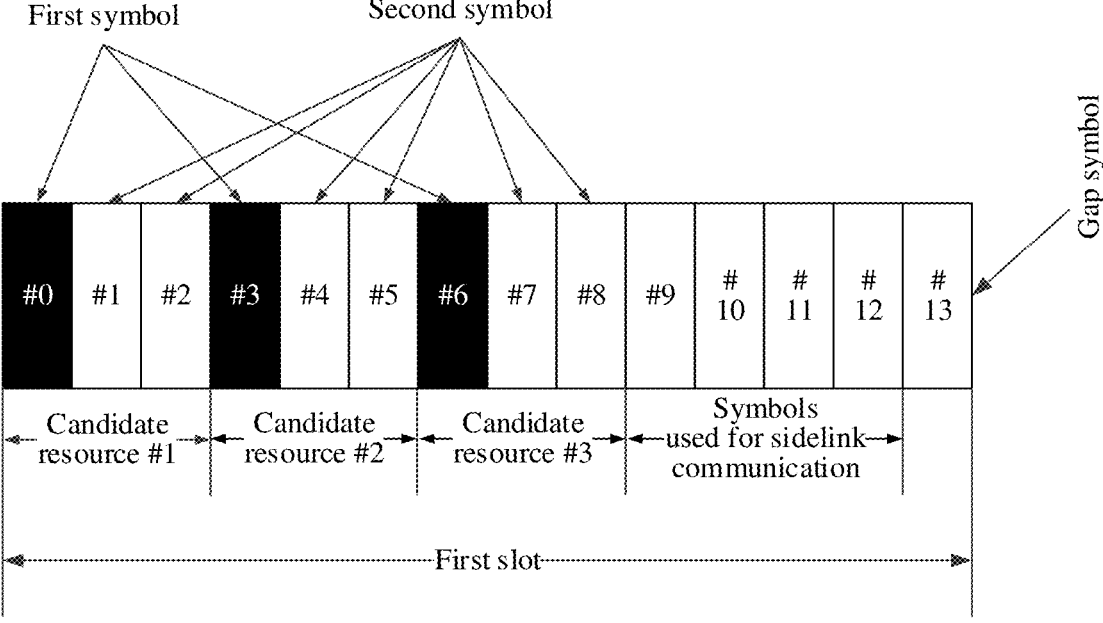
FIG. 8 is a schematic diagram of structure of a candidate resource according to at least one embodiment.

An example of a structure of the first slot is shown in FIG. 8. In the first slot, in response to k=6, a quantity of second symbols is 2, and the last symbol in the first slot is used as a gap symbol, a quantity of candidate resources in the first slot is $$N_{candidateResource}^{PSCCH} = \left\lfloor \frac{14 - (6 - 2 - 1) - 1}{2 + 1} \right\rfloor = 3.$$

Optionally, the first configuration information further indicates a quantity of first symbols and/or a quantity of second symbols in the candidate resource. Optionally, the quantity of first symbols and/or the quantity of second symbols in the candidate resource is a value determined by the first terminal apparatus and/or the second terminal apparatus, a value preconfigured in the first terminal apparatus and/or the second terminal apparatus, or a value predefined in a standard. For example, as shown in FIG. 8, the quantity of first symbols that is in the candidate resource and that is predefined in the standard is 1, and the first configuration information indicates that the quantity of second symbols is 2.

According to the foregoing example, the first terminal apparatus and/or the second terminal apparatus determines the candidate resources based on the first configuration information, and perform sidelink communication based on the candidate resources. The first symbol in any candidate resource is used to send the first information. Therefore, even in response to a channel access moment of the first terminal apparatus being after a start moment of the first symbol in a candidate resource in the first slot, the first terminal apparatus further sends the first information based on the first symbol in another candidate resource after the channel access moment, without waiting for a next slot after the first slot. In this way, a sidelink communication delay is reduced.

At least one embodiment further provides a communication method. A first terminal apparatus sends first information on a first symbol in the $1^{st}$ candidate resource after a channel access moment in a first slot, and sends SCI on a second symbol in the $1^{st}$ candidate resource, to schedule sidelink data. The second terminal apparatus decodes the SCI based on the first information in the first candidate resource, and decode the sidelink data based on the SCI, to implement sidelink communication.

The method shown in FIG. 9 is independent of the procedure shown in FIG. 7, or is performed after the procedure shown in FIG. 7. In other words, execution of the procedure shown in FIG. 9 does not necessarily depend on the configuration process of the first configuration information shown in FIG. 7.

As shown in FIG. 9, the communication method includes the following steps.

S201: The first terminal apparatus sends the first information on the first symbol in the first candidate resource, and sends the SCI on the second symbol in the first candidate resource. The first candidate resource is the $1^{st}$ candidate resource in candidate resources after a first moment. The first moment is the channel access moment of the first terminal apparatus. The first candidate resource is located in the first slot. The first terminal apparatus determines, based on first configuration information from a network device, a location of the first symbol and/or a location of the second symbol. Alternatively, the first symbol and/or the second symbol is preconfigured in the first terminal apparatus or defined in a standard. In the procedure shown in FIG. 9, for the candidate resource, refer to descriptions in FIG. 7. Details are not described herein again.

For example, the first candidate resource is the $1^{st}$ candidate resource whose start moment is after the first moment.

Optionally, the first moment is a moment at which a backoff value K decreases to 0 in response to the first terminal apparatus performing LBT. Alternatively, the first moment is a moment at which the first terminal apparatus wakes up from an energy-saving state to perform SL communication. Alternatively, the first moment is a moment at which the first terminal apparatus accesses a network to send SL information.

Optionally, the first terminal apparatus sends third information on a first resource after the second symbol in the first candidate resource. The third information includes sidelink data and/or sidelink feedback information. In other words, the third information is carried on a PSSCH, or the first resource in at least one embodiment is used to transmit a PSSCH. The first resource includes a first symbol and/or a second symbol after the second symbol. Alternatively, in response to a PSCCH resource and a PSSCH resource that are allocated to the first terminal apparatus being frequency division multiplexed, the first resource includes the second symbol and a first symbol and/or a second symbol after the second symbol. Because the PSCCH resource includes the second symbol in the first candidate resource, in this case, the second symbol in the first candidate resource is multiplexed as the PSSCH resource. In other words, the second symbol in the first candidate resource, and the first symbol and/or the second symbol after the second symbol in the first candidate resource is used to transmit the PSSCH.

Specifically, in response to a quantity of candidate resources located after the first candidate resource being greater than 0, the first resource includes the first symbol and/or the second symbol in the candidate resource located after the first candidate resource. For example, the first resource includes some or all symbols that are located after the second symbol in the first candidate resource in the first slot and that is used for sidelink communication, and the some or all the symbols includes the first symbol and the second symbol of at least one candidate resource.

Figure 10:
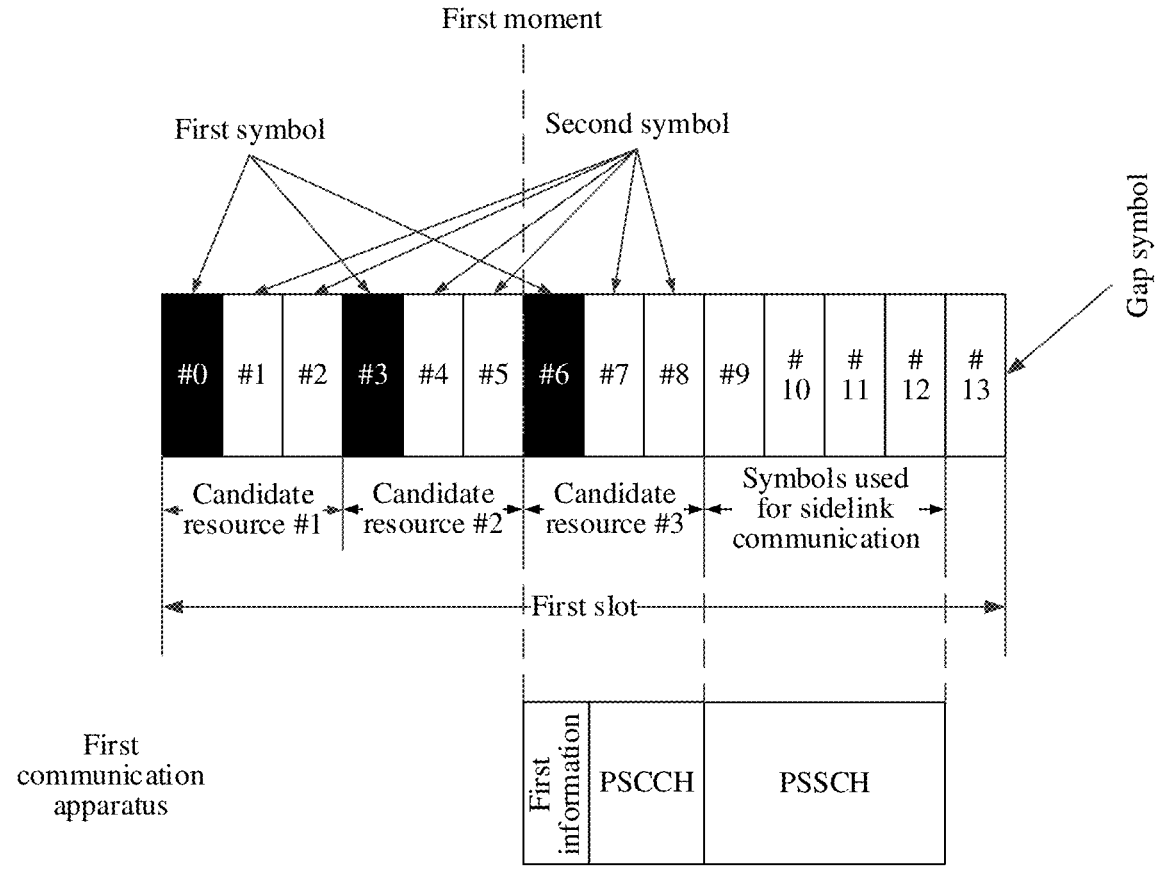
FIG. 10 is a schematic diagram of a resource sent by a terminal apparatus according to at least one embodiment.

As shown in FIG. 10, in response to the first moment of the first terminal apparatus being located at or before a start moment of a symbol #6, the symbol #6 is the 1 st symbol in a candidate resource #3, and the symbol #6 is also a first symbol in the candidate resource #3, the first terminal apparatus sends the first information on the symbol #6. In response to a symbol #7 and a symbol 8 being second symbols in the candidate resource #3, the SCI is sent on the symbol #7 and the symbol 8. In response to the SCI being sent on the symbols #7 and #8, and the PSCCH resource and the PSSCH resource that are allocated to the first terminal apparatus is frequency division multiplexed, the first terminal apparatus further sends the sidelink data on the symbols #7 and #8. The first resource in the example shown in FIG. 10 includes a symbol #9 to a symbol #12. In other words, the symbol #9 to the symbol #12 is used to send the third information. Optionally, in response to the first resource further including another candidate resource in the symbol #9 to the symbol #12, and the PSCCH resource and the PSSCH resource that are allocated to the first terminal apparatus is frequency division multiplexed, the first terminal apparatus sends the third information on the symbol #7 to the symbol #12, that is, in this case, the first resource includes the symbol #7 to the symbol #12.

Optionally, before S201, in response to the first terminal apparatus having accessed the channel before the start moment of the first candidate resource, in response to the first terminal apparatus not performing sidelink sending before the first candidate resource, the channel is occupied by another terminal apparatus through contention. As a result, a transmission delay is further increased. To reduce the transmission delay, the first terminal apparatus sends second information before the first candidate resource, to prevent the accessed channel from being occupied by another terminal apparatus. In at least one embodiment, a start moment of a resource is a start moment of the $1^{st}$ symbol in the resource.

The first terminal apparatus determines, based on a location of the first moment in the first slot, whether to send the second information. Specifically, in response to the first moment being not at a start moment of any candidate resource in the first slot, the second information is sent between the first moment and a start moment of a next candidate resource.

The second information is at least one type of replication information of the first information, replication information of a subset of the first information, replication information of the SCI, replication information of a subset of the SCI, other information, a reference signal such as a demodulation reference signal (DMRS), an extended cyclic prefix (ECP) of the first information, an ECP of the SCI, and other information such as specified information.

Figure 11:
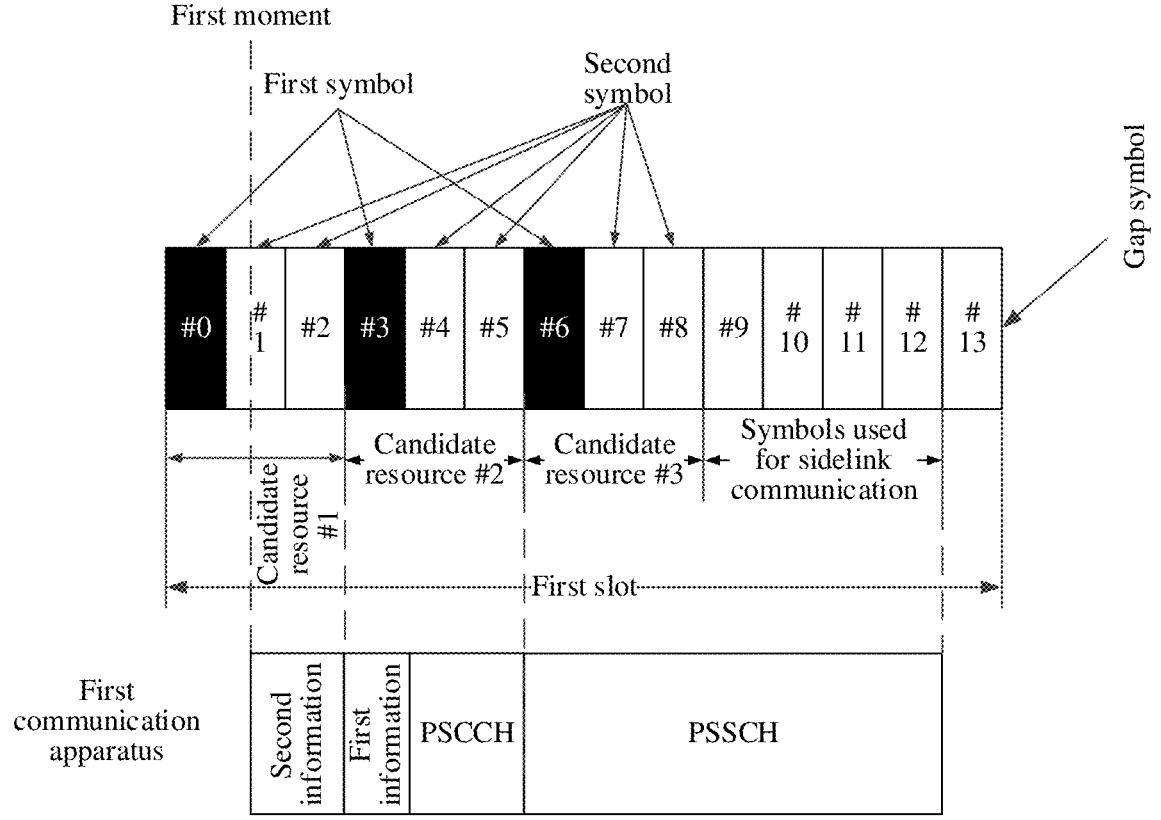
FIG. 11 is a schematic diagram of another resource sent by a terminal apparatus according to at least one embodiment.

FIG. 11 is used as an example. A first moment is located in a symbol #1, that is, not located at a start moment of any candidate resource, the $1^{st}$ candidate resource after the first moment is a candidate resource #2, and a first symbol in the candidate resource #2 is a symbol #3. In this case, the first terminal apparatus sends the second information between the first moment and a start moment of the symbol #3. Specifically, the first terminal apparatus sends the second information on a symbol #2 and a time domain resource that is in the symbol #1 and that is after the first moment. Then, the first terminal apparatus sends the first information on the symbol #3, and further send the SCI on a symbol #4 and a symbol #5, where the symbols #4 and #5 are second symbols in the candidate resource #2, that is, PSCCH resources in this example. In response to the SCI being sent on the symbol #4 and the symbol #5, and the PSCCH resource and the PSSCH resource that are allocated to the first terminal apparatus cannot be frequency division multiplexed, that is, the symbol #4 and the symbol #5 cannot be used to transmit the third information, in this case, in the example shown in FIG. 11, the first resource includes a symbol #6 to a symbol #12. In other words, the symbol #6 to the symbol #12 is used to send the third information. In addition, in response to the PSCCH resource and the PSSCH resource that are allocated to the first terminal apparatus being frequency division multiplexed, that is, the symbol #4 and the symbol #5 being multiplexed to transmit the third information, the first terminal apparatus sends the third information on the symbol #4 to the symbol #12. In this case, the first resource includes the symbol #4 to the symbol #12.

Optionally, in response to the first moment being after a start moment of a first symbol in the last candidate resource in the first slot, the first terminal apparatus sends the first information, the SCI, and the third information only in a next slot. For example, the first terminal apparatus sends the second information on a symbol used for sidelink communication that is after the first moment and that is in the first slot. The first terminal apparatus further sends the first information on a first symbol in the $1^{st}$ candidate resource in the next slot, and send the SCI on a second symbol in the candidate resource.

S202: The second terminal apparatus blindly decodes the SCI on the second symbol.

At a second moment, the second terminal apparatus decodes, based on information carried on the first symbol in the first candidate resource, information carried on the second symbol in the first candidate resource, to obtain the SCI. In other words, the second moment in at least one embodiment is a moment at which the second terminal apparatus obtains the SCI carried on the second symbol in the first candidate resource. After the second moment, the second terminal apparatus decodes, based on the SCI, information carried on a resource after the second symbol. For the second terminal apparatus, the first candidate resource is one of candidate resources in the first slot.

The second terminal apparatus determines, based on the first configuration information from the network device, the location of the first symbol and/or the location of the second symbol in the candidate resource in the first slot. Alternatively, the first symbol and/or the second symbol in the candidate resource in the first slot is preconfigured in the second terminal apparatus or defined in a standard.

According to the method shown in FIG. 9, the first terminal apparatus sends the first information on the first symbol that is of a plurality of first symbols in the first slot and that is in the $1^{st}$ candidate resource after the channel access moment, and sends the SCI on the second symbol in the $1^{st}$ candidate resource after the channel access moment, that is, performs sidelink communication. Therefore, there is no need to wait for a next slot to perform sidelink communication, and a sidelink communication delay is reduced.

The following uses an example to describe a manner in which the second terminal apparatus blindly decodes the SCI and obtains the SCI at the second moment. A method for blindly decoding the SCI in at least one embodiment is not limited thereto.

Because the second terminal apparatus cannot learn of the first moment of the first terminal apparatus, the second terminal apparatus needs to blindly decode the SCI in each candidate resource in the first slot in a time sequence, until the SCI is correctly obtained at the second moment. The blindly decoding the SCI in any candidate resource includes: performing AGC based on information carried on the first symbol in the candidate resource, obtaining an AGC result corresponding to the information, and decoding, based on the AGC result, information carried on the second symbol in a same candidate resource. In response to the decoding succeeding, the SCI carried on the second symbol is obtained. In response to the decoding succeeding, the candidate resource is the first candidate resource, the information carried on the first symbol is the first information, that is, AGC information, and the information carried on the second symbol is the SCI. In other words, the second terminal apparatus determines that the candidate resource is the first candidate resource, the information carried on the first symbol is the first information, that is, the AGC information, and the information carried on the second symbol is the SCI. In response to the decoding failing, the candidate resource is not the first candidate resource, the information carried on the first symbol is not the first information, and the information carried on the second symbol is not the SCI. In other words, the second terminal apparatus determines that the candidate resource is not the first candidate resource, the information carried on the first symbol is not the first information, and the information carried on the second symbol is not the SCI. The second terminal apparatus continues to perform AGC adjustment and blindly decode the SCI in a next candidate resource in the first slot. In addition, the second terminal apparatus traverses the candidate resources in the first slot based on a specified interval and/or a specified sequence to perform the foregoing actions.

Optionally, the second terminal apparatus shown in FIG. 9 further performs AGC based on information carried on a first symbol in an $i^{th}$ candidate resource before the second moment, where i=1, 2, . . . , n, n is a quantity of candidate resources that are in the first slot and that are before the second moment, $$n \leq N_{CandidateResource}^{PSCCH}, \text{ and } N_{CandidateResource}^{PSCCH}$$

is a quantity of candidate resources in the first slot.

In other words, before obtaining the SCI based on the first information, the second terminal apparatus performs AGC on information that is carried on a first symbol in each candidate resource or first symbols in at least two candidate resources and that is received in the first slot, to obtain an AGC result. The AGC result is used for SCI and/or sidelink data reception.

Subsequently, for ease of description, the information carried on the first symbol in the $i^{th}$ candidate resource in the first slot is referred to as $$M_i^{symb1}$$

information, and information carried on the second symbol in the $i^{th}$ candidate resource in the first slot is referred to as $$M_i^{symb2}$$

information. In addition, an AGC result obtained by performing AGC based on the $$M_i^{symb1}$$

information is referred to as an AGC result corresponding to the $$M_i^{symb1}$$

information, where i=1, 2, . . . , n, n is the quantity of candidate resources that are in the first slot and that are before the second moment, $$n \leq N_{CandidateResource}^{PSCCH}, \text{ and } N_{CandidateResource}^{PSCCH}$$

is the quantity of candidate resources in the first slot.

Figure 12:
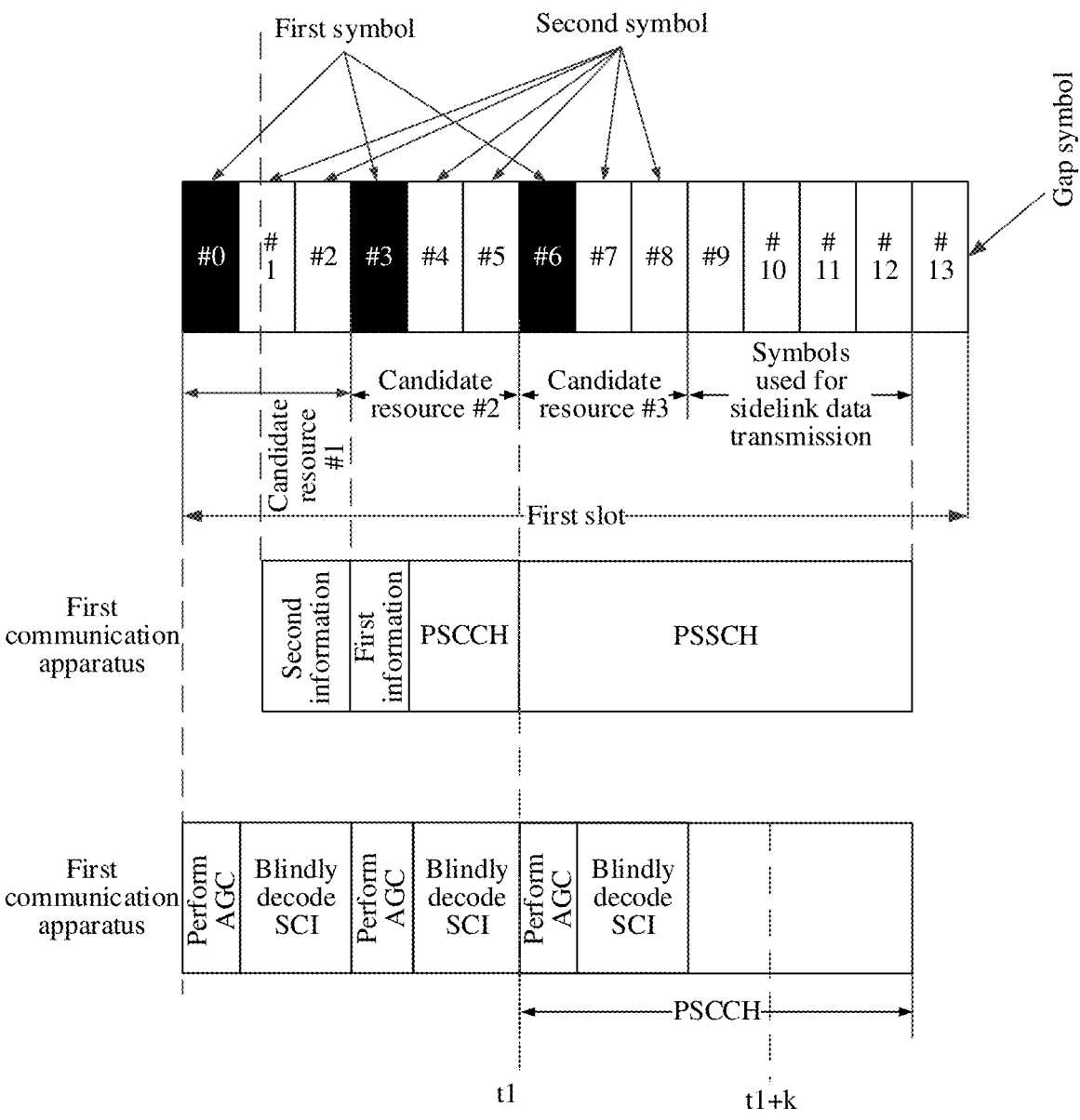
FIG. 12 is a schematic diagram of another resource sent by a terminal apparatus according to at least one embodiment.

With reference to FIG. 12, a process of blindly decoding the SCI in the first slot by the second terminal apparatus and a process of performing AGC by the second terminal apparatus are described herein. In a process of blindly decoding the SCI in any candidate resource, the second terminal apparatus performs AGC based on the information carried on the first symbol in the candidate resource to obtain the AGC result, and blindly decode the SCI based on the AGC result. In other words, the second terminal apparatus determines, based on the AGC result, whether the SCI on the candidate resource is correctly decoded.

As shown in FIG. 12, the second terminal apparatus blindly decodes the SCI in a candidate resource #1. For example, the second terminal apparatus receives $$M_1^{symb1}$$

information on a first symbol, that is, a symbol #0, in the candidate resource #1, performs AGC based on the $$M_1^{symb1}$$

information, to obtain an AGC result corresponding to the $$M_1^{symb1}$$

information, receives, based on the AGC result corresponding to the $$M_1^{symb1}$$

information, $$M_1^{symb2}$$

information on second symbols, that is, a symbol #1 and a symbol #2, in the candidate resource #1, and then blindly decodes the SCI based on the $$M_1^{symb2}$$

information. Then, the second terminal apparatus further blindly decodes the SCI in a candidate resource #2. For example, the second terminal apparatus receives $$M_2^{symb1}$$

information on a first symbol, that is, a symbol #3, in the candidate resource #2, performs AGC based on the $$M_2^{symb1}$$

information, to obtain an AGC result corresponding to the $$M_2^{symb1}$$

information, receives, based on the AGC result corresponding to the $$M_2^{symb1}$$

information, $$M_2^{symb2}$$

information on second symbols, that is, a symbol #4 and a symbol #5, in the candidate resource #2, and then blindly decodes the SCI based on the $$M_2^{symb2}$$

information. Then, the second terminal apparatus further blindly decodes the SCI in a candidate resource #3. For example, the second terminal apparatus receives $$M_3^{symb1}$$

information on a first symbol, that is, a symbol #6, in the candidate resource #3, performs AGC based on the $$M_3^{symb1}$$

information, to obtain an AGC result corresponding to the $$M_3^{symb1}$$

information, receives, based on the AGC result corresponding to the $$M_3^{symb1}$$

information, $$M_3^{symb2}$$

information on second symbols, that is, a symbol #7 and a symbol #8, in the candidate resource #3, and then blindly decodes the SCI based on the $$M_3^{symb2}$$

information.

Optionally, before decoding the $$M_2^{symb2}$$

information based on the AGC result corresponding to the $$M_2^{symb1}$$

information, in response to the second terminal apparatus having obtained the SCI by decoding the $$M_1^{symb2}$$

information based on the AGC result corresponding to the $$M_1^{symb1}$$

information, the second terminal apparatus stops decoding the $$M_2^{symb2}$$

information based on the AGC result corresponding to the $$M_2^{symb1}$$

information. Similarly, before decoding the $$M_3^{symb2}$$

information based on the AGC result corresponding to the $$M_3^{symb1}$$

information, in response to the second terminal apparatus having obtained the SCI by decoding the $$M_1^{symb2}$$

information based on the AGC result corresponding to the $$M_1^{symb1}$$

information, or obtained the SCI by decoding the $$M_2^{symb2}$$

information based on the AGC result corresponding to the $$M_2^{symb1}$$

information, the second terminal apparatus stops decoding the $$M_3^{symb2}$$

information based on the AGC result corresponding to the $$M_3^{symb1}$$

information.

In response to the first terminal apparatus sending the first information on the first symbol, that is, the symbol #6, in the candidate resource #3, and sends the SCI on the second symbols, that is, the symbol #7 and the symbol #8, in the candidate resource #3, because a delay exists in decoding by the second terminal apparatus, the second moment at which the second terminal apparatus obtains the SCI is located after the candidate resource #3. After obtaining the SCI at the second moment based on blind decoding on the candidate resource #3, the second terminal apparatus determines that the candidate resource #3 is the first candidate resource.

After obtaining the SCI, the second terminal apparatus decodes sidelink data in the first slot based on the AGC result for correctly decoding the SCI and the correctly received SCI.

In addition, because the second terminal apparatus needs to receive, based on an AGC result corresponding to $$M_i^{symb1}$$

information carried on a first symbol in the $i^{th}$ candidate resource, $$M_i^{symb2}$$

information carried on a second symbol in the $i^{th}$ candidate resource, to blindly decode the SCI, the second terminal apparatus identifies, based on a case whether the SCI is correctly decoded, whether the $$M_i^{symb2}$$

information is the SCI and whether the $$M_i^{symb1}$$

information is the first information. However, information decoding uses a specific decoding delay. In response to the second terminal apparatus identifying that $$M_p^{symb1}$$

information carried on a first symbol in the $p^{th}$ candidate resource is the first information and identifies that $$M_p^{symb2}$$

information carried on a second symbol in the $p^{th}$ candidate resource is the SCI, the $p^{th}$ candidate resource is the first candidate resource. In addition, third information, such as sidelink data and/or sidelink feedback information, is transmitted on a candidate resource after the $p^{th}$ candidate resource, where $$1 < p \le N_{CandidateResource}^{PSCCH}, \text{ and } N_{CandidateResource}^{PSCCH}$$

is the quantity of candidate resources in the first slot. In this case, the second terminal apparatus cannot delete any information carried on a resource after the $p^{th}$ candidate resource. Otherwise, a packet loss occurs in sidelink transmission, and transmission reliability is reduced.

To improve the transmission reliability, optionally, the second terminal apparatus stores information that is carried on first symbols and second symbols in all candidate resources except the $1^{st}$ candidate resource and that is received before the second moment, for data decoding, and/or the second terminal apparatus stores $$M_j^{symb1}$$

information carried on a first symbol in a $j^{th}$ candidate resource and $$M_j^{symb2}$$

information carried on a second symbol in the $j^{th}$ candidate resource that are received before the second moment, where j=2, 3, . . . , n, n is a quantity of candidate resources that are in the first slot and that are before the second moment, $$n \le N_{CandidateResource}^{PSCCH}, \text{ and } N_{CandidateResource}^{PSCCH}$$

is the quantity of candidate resources in the first slot. For ease of description, the information that is carried on the first symbols and the second symbols in all the candidate resources except the $1^{st}$ candidate resource is referred to as fourth information, and/or the $$M_j^{symb1}$$

information and the $$M_j^{symb2}$$

information that are received by the second terminal apparatus before the second moment is referred to as the fourth information. In other words, the fourth information includes information carried on the first symbols and the second symbols in all the candidate resources except the $1^{st}$ candidate resource, and/or the $$M_j^{symb1}$$

information carried on the first symbol in the $j^{th}$ candidate resource and the $$M_j^{symb2}$$

information carried on the second symbol in the $j^{th}$ candidate resource that are received by the second terminal apparatus before the second moment. As shown in FIG. 8, before or in response to $$M_2^{symb1}$$

information carried on a first symbol in the $2^{nd}$ candidate resource being received, in response to the second terminal apparatus having not correctly decoded the SCI, the second terminal apparatus stores the $$M_2^{symb1}$$

information after receiving the $$M_2^{symb1}$$

information.

In addition, because a start symbol of the $1^{st}$ candidate resource is the start symbol that is used for sidelink transmission in the first slot, the first terminal apparatus sends the first information only on the symbol at the earliest, that is, does not send sidelink data information on the symbol. In this case, the second terminal apparatus does not need to store information about the start symbol that is used for the sidelink transmission in the first slot, that is, does not need to store the $$M_1^{symb1}$$

information carried on the first symbol in the $1^{st}$ candidate resource and the $$M_1^{symb2}$$

information carried on the second symbol in the $1^{st}$ candidate resource.

The following uses FIG. 12 as an example to specifically describe actions performed by the second terminal apparatus.

In FIG. 12, the first terminal apparatus sends the first information on the first symbol, that is, the symbol #3, in the candidate resource #2, sends the SCI on the second symbols, that is, the symbol #4 and the symbol #5, in the candidate resource #2, and sends the sidelink data on the symbol #6 to the symbol #12 that are used for sidelink communication in the first slot, in other words, the first resource includes the symbol #6 to the symbol #12. A moment in the symbol #1 is a moment t1. The second terminal apparatus performs AGC based on the $$M_1^{symb1}$$

information received on the first symbol that is used for sidelink communication in the first slot, to obtain the AGC result corresponding to the $$M_1^{symb1}$$

information, where the first symbol that is used for sidelink communication is the symbol #0, and the symbol #0 is the first symbol in the candidate resource #1. The second terminal apparatus decodes based on the AGC result corresponding to the $$M_1^{symb1}$$

information, the $$M_1^{symb2}$$

information received on the second symbols, that is, the symbol #1 and the symbol #2, in the candidate resource #1. Due to a decoding delay, the second terminal apparatus cannot complete decoding the $$M_1^{symb2}$$

information immediately after receiving the $$M_1^{symb2}$$

information. In other words, the second terminal apparatus cannot complete decoding the $$M_1^{symb2}$$

information at an end moment of the symbol #2 or a start moment of the symbol #3, and therefore does not know whether the SCI is obtained. Therefore, before completing decoding the $$M_1^{symb2}$$

information, the second terminal apparatus performs AGC processing based on the $$M_2^{symb1}$$

information received on the first symbol, that is, the symbol #3, in the candidate resource #2, to determine the AGC result corresponding to the $$M_2^{symb1}$$

information, and/or store the $$M_2^{symb1}$$

information. Then, the second terminal apparatus decodes, based on the AGC result corresponding to the $$M_2^{symb1}$$

information, the $$M_2^{symb2}$$

information received on the second symbols, that is, the symbol #4 and the symbol #5, in the candidate resource #2.

In response to at the moment t1, the second terminal apparatus having not correctly decoded, based on the AGC result corresponding to the $$M_i^{symb1}$$

information received on the first symbol in the $i^{th}$ candidate resource, the $$M_i^{symb2}$$

information received on the second symbol in the it h candidate resource, to obtain the SCI, where i=1 or 2, the second terminal apparatus continues to perform AGC based on the $$M_3^{symb1}$$

information received on the first symbol, that is, the symbol #6, in the candidate resource #3, to obtain the AGC result corresponding to the $$M_3^{symb1}$$

information, store the $$M_3^{symb1}$$

information, and decode, based on the AGC result corresponding to the $$M_3^{symb1}$$

information, the $$M_3^{symb2}$$

information received on the second symbols, that is, the symbol #7 and the symbol #8, in the candidate resource #3. At a moment t1+k, the second terminal apparatus correctly decodes, based on the AGC result corresponding to the $$M_2^{symb1}$$

information received on the symbol #3, the $$M_2^{symb2}$$

information received on the symbol #4 and the symbol #5, to obtain the SCI. In this case, the moment t1+k is the second moment. After the moment t1+k, the second terminal apparatus decodes, based on the SCI, sidelink data information scheduled by the SCI, where t1+k>t1. Specifically, in response to the PSCCH resource and the PSSCH resource that are allocated to the first terminal apparatus being frequency division multiplexed, the second terminal apparatus decodes sidelink data information received on the symbol #4 and a symbol after the symbol #4 that are used for sidelink communication, where the symbol #4 and the symbol after the symbol #4 that are used for sidelink communication include the $$M_3^{symb1}$$

information stored in the second terminal apparatus. Otherwise, in response to the PSCCH resource and the PSSCH resource that are allocated to the first terminal apparatus not being able to be frequency division multiplexed, the second terminal apparatus decodes sidelink data information received on the symbol #6 and a symbol after the symbol #6 that are used for sidelink communication, where the information received on the symbol #6 and the symbol after the symbol #6 that are used for sidelink communication includes the $$M_3^{symb1}$$

information stored in the second terminal apparatus.

Optionally, after the second moment, the second terminal apparatus stops performing AGC and blindly decoding the SCI on the candidate resource in the first slot, to reduce processing overheads. For example, as shown in FIG. 12, after the moment t1+k, even in response to the first slot further including a candidate resource, the second terminal apparatus no longer performs AGC based on information carried on a first symbol in the candidate resource that is in the first slot and that is after the moment t1+k, and no longer blindly decodes the SCI based on a second symbol in the candidate resource that is in the first slot and that is after the moment t1+k.

In another case, in response to the second terminal apparatus learning before a slot x that the first terminal apparatus is to send the first information on a first symbol in the 1$^{st}$ candidate resource in the slot x, the second terminal apparatus performs AGC only on the first symbol in the 1$^{st}$ candidate resource in the slot x, and performs, based on an AGC result, PSCCH decoding on information received on a second symbol in the 1$^{st}$ candidate resource. Optionally, even in response to the PSCCH decoding by the second terminal apparatus failing in this case, PSCCH decoding is not performed on a second symbol in another candidate resource in the slot x. Similarly, AGC processing is not performed on a first symbol in another candidate resource in the slot x.

At least one embodiment provides a communication apparatus. The communication apparatus is configured to implement the first terminal apparatus in the foregoing embodiments, and the communication apparatus includes the structure shown in FIG. 5 and/or FIG. 6. The communication apparatus is configured to perform the steps performed by the first terminal apparatus in the foregoing method embodiments.

At least one embodiment provides a communication apparatus. The communication apparatus is configured to implement the second terminal apparatus in the foregoing embodiments, and the communication apparatus includes the structure shown in FIG. 5 and/or FIG. 6. The communication apparatus is configured to perform the steps performed by the second terminal apparatus in the foregoing method embodiments.

At least one embodiment provides a communication apparatus. The communication apparatus is configured to implement the network device in the foregoing embodiments, and the communication apparatus includes the structure shown in FIG. 5 and/or FIG. 6. The communication apparatus is configured to perform the steps performed by the network device in the foregoing method embodiments.

At least one embodiment provides a communication system. The communication system includes the first terminal apparatus, the second terminal apparatus, and the network device in the foregoing embodiments, configured to implement the method shown in FIG. 7. Alternatively, the communication system includes the first terminal apparatus and the second terminal apparatus in the foregoing embodiments, configured to implement the method shown in FIG. 9.

At least one embodiment further provides a computer-readable storage medium. The computer-readable storage medium stores a computer program. In response to the computer program being executed by a computer, the computer implements a procedure related to the first terminal apparatus, the second terminal apparatus, and/or the network device in any one of the foregoing method embodiments.

At least one embodiment further provides a computer program product. The computer program product is configured to store a computer program. In response to the computer program being executed by a computer, the computer implements a procedure related to the first terminal apparatus, the second terminal apparatus, and/or the network device in any one of the foregoing method embodiments.

At least one embodiment further provides a chip or a chip system. The chip includes a processor. The processor is configured to invoke a program or instructions in a memory, to perform a procedure related to the first terminal apparatus, the second terminal apparatus, and/or the network device in any one of the foregoing method embodiments. The chip system includes the chip, and further includes another component such as a memory or a transceiver.

At least one embodiment further provides a circuit. The circuit is coupled to a memory, and is configured to perform a procedure related to the first terminal apparatus, the second terminal apparatus, and/or the network device in any one of the foregoing method embodiments. The chip system includes the chip, and further includes another component such as a memory or a transceiver.

Sequence numbers of the foregoing processes do not mean execution sequences in at least one embodiment. The execution sequences of the processes should be determined based on functions and internal logic of the processes, and should not be construed as any limitation on the implementation processes of at least one embodiment.

In at least one embodiment, both "when" and "if" mean that an apparatus performs corresponding processing in an objective situation, but do not constitute a limitation on time, do not rely on the apparatus to perform a determining action during implementation, and do not mean any other limitation.

A person skilled in the art understands that various numbers such as "first" and "second" embodiments described herein are merely used for differentiation for ease of description, and are not used to limit the scope of embodiments described herein. A specific value of a number or an index, a specific value of a quantity, and a location in at least one embodiment are merely used as examples, but are not unique representation forms, and are not used to limit the scope of embodiments described herein. Various numbers such as "first" and "second" in at least one embodiment are merely used for differentiation for ease of description, and are not used to limit the scope of embodiments described herein.

In addition, the term "and/or" in embodiments described herein describes only an association relationship for describing associated objects and represents that three relationships exist. For example, A and/or B represent the following three cases: Only A exists, both A and B exist, and only B exists. In addition, the character "/" in embodiments described herein generally indicates an "or" relationship between the associated objects. The term "at least one" in embodiments described herein represents "one" and "two or more". For example, at least one of A, B, and C indicate the following seven cases: Only A exists, only B exists, only C exists, both A and B exist, both A and C exist, both C and B exist, and A, B, and C exist.

A person skilled in the art should understand that embodiments described herein are provided as a method, a system, or a computer program product. Therefore, embodiments described herein use a form of hardware only embodiments, software only embodiments, or embodiments with a combination of software and hardware. In addition, embodiment described herein use a form of a computer program product implemented on one or more computer-usable storage media that include computer-usable program code. The storage media include but are not limited to a magnetic disk memory, a CD-ROM, an optical memory, and the like.

At least one embodiment is described with reference to the flowcharts and/or block diagrams of the method, the device, the system, and the computer program product according to embodiment described herein. Computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions are stored in a computer-readable memory that guides the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions are alternatively loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

A person skilled in the art is able to make various modifications and variations to embodiment described herein without departing from the scope of embodiment described herein. At least one embodiment is intended to cover these modifications and variations of embodiments described herein provided that they fall within the scope of protection defined by the following claims and their equivalent technologies.

What is claimed is:

1. A communication method, comprising:
obtaining first configuration information; and
determining, based on the first configuration information, at least two candidate resources in a first slot, wherein each of the at least two candidate resources includes a plurality of consecutive symbols including at least one first symbol and at least one second symbol, the at least one first symbol in each of the at least two candidate resources is usable to transmit first information, the at least one second symbol in each of the at least two candidate resources is usable to transmit sidelink control information, and the first symbol precedes the second symbol.

2. The method according to claim 1, wherein the first configuration information includes information about a quantity of consecutive second symbols in each of the at least two candidate resources.

3. The method according to claim 1, applied to a first terminal apparatus and further comprising:
sending the first information on the at least one first symbol in a first candidate resource, and sending the sidelink control information on the at least one second symbol in the first candidate resource, wherein the first candidate resource is a $1^{st}$ candidate resource among the at least two candidate resources after a first moment, the first moment is a channel access moment of the first terminal apparatus.

4. The method according to claim 3, wherein the first moment is before a start moment of the first candidate resource, the method further comprises:
sending second information between the first moment and the start moment of the first candidate resource.

5. The method according to claim 4, wherein the sending the second information includes sending second information that includes replication information of the first information, replication information of the sidelink control information, an extended cyclic prefix of the first information, or an extended cyclic prefix of the sidelink control information.

6. The method according to claim 3, further comprising:
sending third information on a first resource, wherein the first resource includes the first symbol or the second symbol after the first candidate resource, and the third information is carried on a sidelink data channel.

7. The method according to claim 1, applied to a second terminal apparatus and further comprising:
blindly decoding the sidelink control information on the second symbol.

8. The method according to claim 7, further comprising:
after a second moment, stopping blindly decoding the sidelink control information, wherein the second moment is a moment at which the second terminal apparatus obtains the sidelink control information carried on the second symbol in the first candidate resource, and the first candidate resource is one of the at least two candidate resources.

9. The method according to claim 7, wherein the blindly decoding the sidelink control information on the second symbol includes:
performing automatic gain control adjustment based on information carried on the first symbol in an ith candidate resource before a second moment, wherein i=1, 2, . . . , n n is a quantity of candidate resources that are in the first slot and that are before the second moment, the second moment is a moment at which the second terminal apparatus obtains the sidelink control information carried on the second symbol in the first candidate resource, and the first candidate resource is one of the at least two candidate resources; and
decoding, based on a result of the automatic gain control adjustment, information carried on the second symbol in the ith candidate resource.

10. The method according to claim 7, further comprising:
storing at least one piece of fourth information, wherein the fourth information is information carried on the first symbol and the second symbol in a jth candidate resource before a second moment, wherein j=2, 3, . . . , n, n is a quantity of candidate resources that are in the first slot and that are before the second moment, the second moment is a moment at which the second terminal apparatus obtains the sidelink control information carried on the second symbol in the first candidate resource, and the first candidate resource is one of the at least two candidate resources.

11. The method according to claim 10, further comprising:

decoding, based on the sidelink control information, the fourth information after the first candidate resource and information after a last piece of the fourth information.

12. The method according to claim 1, wherein the first information is replication information of the sidelink control information, replication information of a subset of the sidelink control information, replication information of information on any symbol in the first slot, or a sequence used for AGC adjustment.

13. A communication method, comprising:

determining first configuration information, wherein the first configuration information indicates at least two candidate resources in a first slot, each of the at least two candidate resources includes a plurality of consecutive symbols including at least one first symbol and at least one second symbol, the at least one first symbol in each of the at least two candidate resources is usable to transmit first information, the at least one second symbol in each of the at least two candidate resources is usable to transmit sidelink control information, and the first symbol precedes the second symbol; and sending the first configuration information.

14. The method according to claim 13, wherein the first configuration information includes information about a quantity of consecutive second symbols in each of the at least two candidate resources.

15. A communication apparatus, comprising:

at least one processor configured to:

determine a first moment;

obtain first configuration information; and determine, based on the first configuration information, at least two candidate resources in a first slot, wherein each of the at least two candidate resources includes a plurality of consecutive symbols including at least one first symbol and at least one second symbol, the at least one first symbol in each of the at least two candidate resources is usable to transmit first information, the at least one second symbol in each of the at least two candidate resources is usable to transmit sidelink control information, and the first symbol precedes the second symbol.

16. The communication apparatus according to claim 15, wherein the first configuration information includes information about a quantity of consecutive second symbols in each of the at least two candidate resources.

17. The communication apparatus according to claim 15, wherein the at least one processor is further configured to:

send the first information on the at least one first symbol in a first candidate resource, and send the sidelink control information on the at least one second symbol in the first candidate resource, wherein the first candidate resource is a 1st candidate resource among the at least two candidate resources after a first moment, the first moment is a channel access moment of a first terminal apparatus.

18. The communication apparatus according to claim 17, wherein the first moment is before a start moment of the first candidate resource, and the at least one processor is further configured to:

send second information between the first moment and the start moment of the first candidate resource.

19. The communication apparatus according to claim 18, wherein the second information includes replication information of the first information, replication information of the sidelink control information, an extended cyclic prefix of the first information, or an extended cyclic prefix of the sidelink control information.

20. The communication apparatus according to claim 17, wherein the at least one processor is further configured to:

send third information on a first resource, wherein the first resource includes the first symbol or the second symbol after the first candidate resource, and the third information is carried on a sidelink data channel.

21. The communication apparatus according to claim 15, wherein the at least one processor is further configured to:

blindly decode the sidelink control information on the second symbol.

22. The communication apparatus according to claim 15, wherein the first information is replication information of the sidelink control information, replication information of a subset of the sidelink control information, replication information of information on any symbol in the first slot, or a sequence used for AGC adjustment.

23. A communication apparatus, comprising:

at least one processor configured to:

determine first configuration information, wherein the first configuration information indicates at least two candidate resources in a first slot, each of the at least two candidate resources includes a plurality of consecutive symbols including at least one first symbol and at least one second symbol, the at least one first symbol in each of the at least two candidate resources is usable to transmit first information, the at least one second symbol in each of the at least two candidate resources is usable to transmit sidelink control information, and the first symbol precedes the second symbol; and send the first configuration information.

24. The communication apparatus according to claim 23, wherein the first configuration information includes information about a quantity of consecutive second symbols in each of the at least two candidate resources.

* * * * *